United States Patent
Chen et al.

(10) Patent No.: US 12,526,754 B2
(45) Date of Patent: Jan. 13, 2026

(54) METHOD FOR CONTROLLING OUTPUT POWER OF ANTENNA, MEDIUM, AND DEVICE

(71) Applicant: HUAWEI TECHNOLOGIES CO., LTD., Guangdong (CN)

(72) Inventors: Yan Chen, Shanghai (CN); Shangbang Sun, Shanghai (CN); Bingguang Peng, Shanghai (CN); Fei Yang, Shanghai (CN); Rentian Ding, Shanghai (CN); Qian Zhang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 425 days.

(21) Appl. No.: 18/002,039

(22) PCT Filed: Jun. 11, 2021

(86) PCT No.: PCT/CN2021/099796
§ 371 (c)(1),
(2) Date: Dec. 15, 2022

(87) PCT Pub. No.: WO2021/254275
PCT Pub. Date: Dec. 23, 2021

(65) Prior Publication Data
US 2023/0345387 A1    Oct. 26, 2023

(30) Foreign Application Priority Data

Jun. 18, 2020 (CN) .......................... 202010560634.8

(51) Int. Cl.
*H04W 52/36* (2009.01)
*H04W 52/32* (2009.01)

(52) U.S. Cl.
CPC ......... *H04W 52/367* (2013.01); *H04W 52/32* (2013.01)

(58) Field of Classification Search
CPC . H04W 52/367; H04W 52/32; H04W 52/325; H04W 52/16; H04B 1/0475; H04B 7/0404
See application file for complete search history.

(56) References Cited

U.S. PATENT DOCUMENTS

2016/0337987 A1* 11/2016 Yi .................... H04W 52/325
2017/0238268 A1*  8/2017 Yang ................ H04W 72/0446
370/329

(Continued)

*Primary Examiner* — Christine Ng
(74) *Attorney, Agent, or Firm* — Fish & Richardson P.C.

(57) ABSTRACT

This application provides example methods for controlling an output power of an antenna for user equipment. One example method includes, during a sounding reference signal (SRS) transmission period, transmitting, by a first antenna of at least one antenna of the user equipment, a first SRS signal to a base station at a first SRS output power, where the first SRS output power is equal to a maximum output power ($P_{cmax}$) of the first antenna. During the SRS period, a non-SRS signal is transmitted to the base station at a non-SRS output power, where the non-SRS output power is less than a difference between the maximum output power of the first antenna and a maximum output power reduction of the first antenna, and the maximum output power reduction of the first antenna is set to meet an electromagnetic power density exposure requirement of the first antenna.

20 Claims, 14 Drawing Sheets

(56) References Cited

U.S. PATENT DOCUMENTS

| | | | | |
|---|---|---|---|---|
| 2017/0366311 A1* | 12/2017 | Iyer | .................. | H04B 7/0482 |
| 2018/0368078 A1* | 12/2018 | Vintola | .................. | H04L 5/0048 |
| 2018/0368083 A1* | 12/2018 | Yang | .................. | H04B 7/0486 |
| 2019/0082399 A1* | 3/2019 | Loehr | .................. | H04W 72/21 |
| 2020/0205088 A1* | 6/2020 | Yang | .................. | H04W 72/12 |
| 2020/0395981 A1* | 12/2020 | Petersson | .................. | H04L 5/005 |
| 2021/0068060 A1* | 3/2021 | Nilsson | .................. | H04B 7/0608 |
| 2023/0156627 A1* | 5/2023 | Yuan | .................. | H04W 52/365 |
| | | | | 370/318 |
| 2023/0179368 A1* | 6/2023 | Nilsson | .................. | H04L 25/0204 |
| | | | | 370/329 |

\* cited by examiner (a)

(b)

$P_0 = P_{cmax0} - P\_MPR_0$

METHOD FOR CONTROLLING OUTPUT POWER OF ANTENNA, MEDIUM, AND DEVICE

CROSS-REFERENCE TO RELATED APPLICATIONS

This application is a national stage of International Application No. PCT/CN2021/099796, filed on Jun. 11, 2021, which claims priority to Chinese Patent Application No. 202010560634.8, filed on Jun. 18, 2020, which is hereby incorporated by reference in its entirety.

TECHNICAL FIELD

One or more embodiments of this application usually relate to the communications field, and specifically, to a method for controlling an output power of an antenna, a medium, and a device.

BACKGROUND

With the development of information technologies, the impact of electromagnetic radiation of wireless communications terminals on human health has attracted increasing attention. In this field, electromagnetic radiation is usually measured by using an indicator SAR (Specific Absorption Rate), and a higher SAR value indicates greater radiation to a human body. For the sake of security, SAR values of electronic devices such as mobile phones should comply with relevant laws and regulations.

In wireless communication that supports beamforming (beamforming), a base station needs to detect locations of terminals, quality of transmission paths, and the like, so that resources of the base station can be more accurately allocated to each terminal. That a terminal sends a sounding reference signal (Sounding Reference Signal, SRS) to a base station is one of manners used by the base station to detect a location of the terminal and channel quality. An SRS signal is an important signal in wireless communication transmission, is uplink reference information sent by user equipment (User Equipment, UE) to a base station, and reflects channel quality. Therefore, it is expected that an output power of each antenna of the UE matches a corresponding receiving capability, and the UE transmits signals at a maximum output power as much as possible.

However, to avoid an excessive SAR value, output power of an SRS signal is usually limited. This causes channel reciprocity to be damaged, that is, the output power does not match a corresponding receiving capability. In addition, limiting the output power of the SRS signal reduces a signal-to-noise ratio of an SRS channel received by a base station, affecting downlink beamforming performance. For a user, a download speed is affected.

SUMMARY

The following describes this application from a plurality of aspects. For implementations and beneficial effects of the following plurality of aspects, refer to each other.

Generally, electromagnetic radiation of a wireless communications terminal may be reduced by reducing an output power of an antenna, to meet an SAR value specification. However, reducing the output power of the antenna may degrade communication quality. Therefore, a balance between reducing the output power and ensuring communication quality needs to be considered.

To cope with the foregoing scenario, according to a first aspect, an implementation of this application provides a method for controlling an output power of an antenna for user equipment, so that an SAR value specification is met without affecting the output power of the antenna. The method includes: A first transmit antenna of at least one antenna of the user equipment transmits a first sounding reference signal (SRS) signal to a base station at a maximum output power during a sounding reference signal (SRS) transmission period, and transmits a non-SRS signal to the base station at non-SRS output power during the SRS period, where the non-SRS output power is less than a difference between the maximum output power and a maximum output power reduction, and the maximum output power reduction is set to meet an electromagnetic power density exposure requirement of the first transmit antenna.

In some implementations, the electromagnetic power density exposure requirement is related to at least one of a specific absorption rate (SAR), a location of the first antenna in the user equipment, and a distance between the user equipment and a user.

In some implementations, the first SRS signal includes an antenna switch (AS) SRS signal or SRS signal that switches between a code book (CB) SRS signal and an antenna switch (AS) SRS signal for reuse.

In some implementations, when the first SRS signal includes the AS SRS signal, another transmit antenna transmits the first SRS signal to the base station at the first SRS output power; and when the first SRS signal includes the SRS signal that switches between a CB SRS signal and an AS SRS signal for reuse, the another transmit antenna transmits the AS SRS signal of the first SRS signal to the base station at the first SRS output power.

In some implementations, a non-SRS signal power decrease value is calculated according to the following formula:

$$\sum_{i=0}^{T-1}(P_{cmaxi} - s_i) \times r_i = SRS_{delta} \times \left(1 - \sum_{i=0}^{T-1} r_i\right)$$

where a maximum output power, a P-MPR, a proportion of SRS signals during an SRS period of each antenna, and a quantity of times for performing antenna switch are respectively $P_{cmaxi}$, $s_i$, $r_i$, and T, and $SRS_{delta}$ is the non-SRS signal power decrease value. The non-SRS output power is equal to the difference between the maximum output power of the first transmit antenna and the maximum output power reduction of the first transmit antenna minus the non-SRS signal power decrease value.

In some implementations, the first transmit antenna transmits a second sounding reference signal (SRS) signal to the base station during the SRS period, where the second SRS output power is equal to the difference between the maximum output power and the maximum output power reduction.

In some implementations, the first SRS signal includes an antenna switch (AS) SRS signal, and the second SRS signal includes a CB SRS signal.

In some implementations, another transmit antenna transmits the first SRS signal at the first SRS output power.

In some implementations, the method according to this application further includes: When the SRS period occurs irregularly, a proportion of a quantity of SRS signals to a total quantity of symbols is obtained, and is compared with a proportion threshold.

When the proportion is greater than the proportion threshold, the non-SRS signal power decrease value is increased.

When the proportion is less than or equal to the proportion threshold, a power decrease value corresponding to the proportion threshold is used, where the ratio threshold and the non-SRS signal power decrease value are obtained when the SRS period occurs regularly.

In some implementations, the non-SRS signal includes other signals transmitted through uplink channels PUCCH, PUSCH, and PRACH.

According to a second aspect, this application provides a method for controlling an output power of an antenna for user equipment, where each of a plurality of antennas of the UE transmits an SRS signal and a non-SRS signal at same power. Specifically, the method includes: During a sounding reference signal (SRS) period, each antenna of user equipment transmits an SRS signal to a base station at a sounding reference signal (SRS) output power of a first antenna, where the SRS output power is equal to a difference between a maximum output power and a maximum output power reduction of the first antenna, and the maximum output power reduction is set to meet an electromagnetic power density exposure requirement of the first antenna. The first antenna transmits a non-SRS signal at an output power equal to the SRS transmit power.

In some implementations, the first antenna is an antenna that first transmits the SRS signal during the SRS period.

According to a third aspect, this application provides a method for controlling an output power of an antenna for user equipment, where a plurality of antennas of the UE reduce SRS signal output powers by a same maximum output power reduction. Specifically, the method includes: During a sounding reference signal (SRS) period, each of a plurality of antennas of the user equipment transmits an SRS signal to a base station, where an SRS output power of each antenna is equal to a difference between a respective maximum output power of each antenna and a maximum output power reduction of a first antenna, the maximum output power reduction of the first antenna is the largest among those of all antennas, and the maximum power reduction of the first antenna is set to meet an electromagnetic power density exposure requirement. In addition, during the SRS period, the first antenna transmits a non-SRS signal at the SRS output power of the first antenna.

According to a fourth aspect, this application provides a method for controlling an output power of an antenna for user equipment, where the method includes: Sounding reference signal (SRS) transmitting capability information and a first class combination of an SRS signal are sent to a base station. SRS configuration information from the base station is received, and a second class combination of the SRS signal is sent to the base station.

The SRS signal is transmitted to the base station based on the SRS configuration information.

In some implementations, the second class combination is the same as the first class combination, or is included in the first class combination.

Specifically, the first class combination includes at least one of the following classes: only an antenna switch (AS) class, and a class of an SRS signal that switches between a code book (CB) SRS signal and an antenna switch SRS signal for reuse.

In some implementations, the method further includes: When the first class combination includes the class of the SRS signal that switches between an AS SRS signal and a CB SRS signal for reuse, a maximum output power reduction of a first antenna is sent to the base station, where the first antenna is an antenna that transmits a CB SRS signal, and the maximum output power reduction is set to meet an electromagnetic power density exposure requirement of the first antenna.

In some implementations, the SRS capability information further indicates at least one of the following information: a capability item range, whether mandatory, whether there is a difference between TDD and FDD, and whether there is a difference between FR1 and FR2 (frequency bands).

According to a fifth aspect, this application provides a method for controlling an output power of an antenna for a base station. The method includes: Sounding reference signal (SRS) sending capability information and a first class combination of an SRS signal from user equipment are received. SRS configuration information (SRS configuration IE) and a second class combination of the SRS signal are sent to the user equipment.

In some implementations, the second class combination is the same as the first class combination, or is included in the first class combination.

Specifically, the first class combination includes at least one of the following classes: only an antenna switch (AS) class, and a class of an SRS signal that switches between an antenna switch SRS signal and a code book (CB) SRS signal for reuse.

In some implementations, the method further includes: When the first class combination includes the class of the SRS signal that switches between an AS SRS signal and a CB SRS signal for reuse, a maximum output power reduction of a first antenna is received, where the first antenna is an antenna that transmits a CB SRS signal, and the maximum output power reduction is set to meet an electromagnetic power density exposure requirement of the first antenna.

In some implementations, the SRS capability information further indicates at least one of the following information: a capability item range, whether mandatory, whether there is a difference between TDD and FDD, and whether there is a difference between FR1 and FR2 (frequency bands).

According to a sixth aspect, this application provides a machine-readable medium, where the medium stores instructions, and when the instructions are run on a machine, the machine performs the methods according to the first aspect to the fifth aspect.

According to a seventh aspect, this application provides a device, including a processor, and a memory. The memory stores instructions, and when the instructions are run by the processor, user equipment performs the methods according to the first aspect to the fifth aspect.

According to some aspects of this application, effects of this application include but are not limited to:

According to various implementations of this application, each antenna of the user equipment transmits an SRS signal at a maximum output power, thereby ensuring reciprocity between uplink and downlink channels and meeting an SAR value specification.

In addition, according to various implementations of this application, whether to adjust the maximum output power of each antenna of the user equipment may be selectively determined, to ensure channel and communication quality on the premise that the SAR value specification is met.

DESCRIPTION OF EMBODIMENTS

Figure 1:
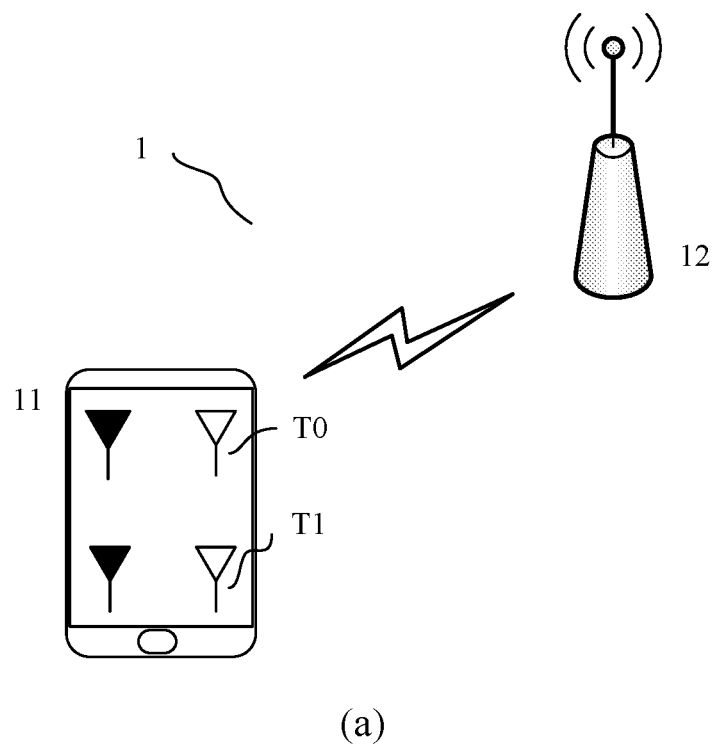
FIG. 1 is a schematic diagram of an application scenario according to an embodiment of this application.
Figure 1:
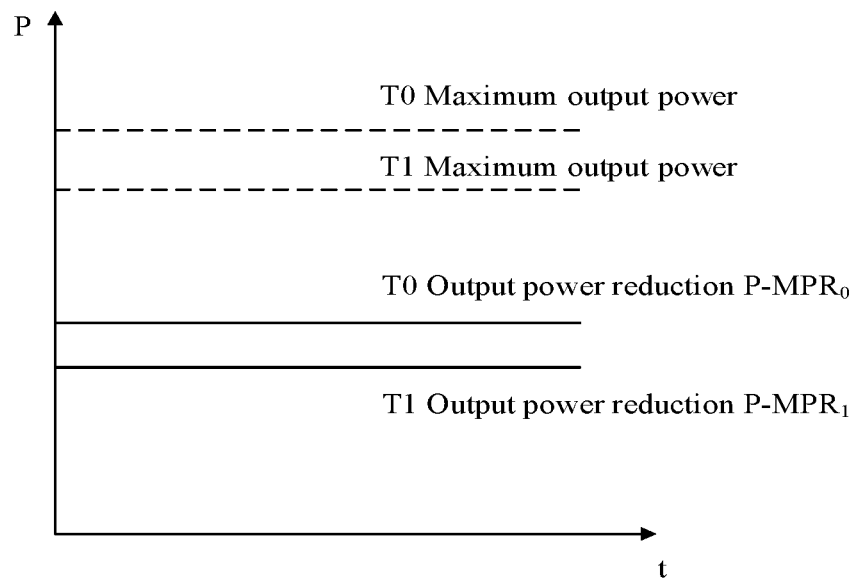

The following further describes this application with reference to specific embodiments and the accompanying drawings.

It should be understood that although terms such as "first" and "second" may be used herein to describe units or data, these units or data should not be limited by these terms. These terms are merely used to distinguish one feature from another feature. For example, without departing from the scope of example embodiments, a first feature may be referred to as a second feature, and similarly the second feature may be referred to as the first feature.

It should be noted that, in this specification, reference numerals and letters in the following accompanying drawings represent similar items. Therefore, once an item is defined in an accompanying drawing, the item does not need to be further defined or interpreted in subsequent accompanying drawings.

To make objectives, technical solutions, and advantages of this application clearer, the following further describes implementations of this application in detail with reference to accompanying drawings.

FIG. 1 is a schematic diagram of an application scenario according to an embodiment of this application. The application scenario includes a communications system 100 including at least one user equipment (User Equipment, UE) 110 (only one is shown) and at least one network device 120 (only one is shown).

Currently, user equipment is generally equipped with a plurality of transmit and receive antennas. If the plurality of antennas of the user equipment are fully used to report channel information in turn, that is, if antenna switch is performed, information obtained by the network device can be more comprehensive, and more accurate data transmission can be performed. In FIG. 1, (a) shows user equipment 110 with four antennas. The four antennas are divided into groups of two antennas. One antenna is selected from each group, and a total of two antennas are used to simultaneously transmit signals. Then, the other two antennas alternately send signals in a next timeslot, that is, antenna switch of 2T4R is used. In FIG. 1, (a) shows a moment at which two antennas T0 and T1 on the right simultaneously transmit SRS signals to the network device 120.

To ensure that an SAR value complies with relevant laws and regulations, an output power of a transmit antenna is reduced to meet an electromagnetic power density exposure requirement (Electromagnetic Power Density Exposure Requirement). In the conventional technology, to ensure that the SAR value complies with the relevant laws and regulations to meet the electromagnetic power density exposure requirement, each antenna in the UE decreases an output power by a fixed value that is referred to as a maximum output power reduction (Maximum Output Power Reduction, P_MPR). That is, the output power of the antenna after the output power is reduced is a difference between a maximum output power of the antenna and the maximum output power reduction.

In the conventional technology, the SAR value is tested based on an extreme scenario, that is, based on a maximum output power and a maximum possible uplink transmission period within 6 minutes, and SAR values corresponding to different distances are tested. Based on certification indicators of different SAR values in different countries, maximum output power reductions corresponding to different distances are determined to ensure that the SAR is not excessive.

In an actual application scenario, for example, when a user makes a call, and a sensor in user equipment senses that the user holds the user equipment to approach the head, the user equipment determines a corresponding maximum output power reduction based on a detected distance between the user equipment and the user, and reduces an output power of an antenna, so as to reduce an SAR value to meet an electromagnetic power density exposure requirement.

In some embodiments, when a distance between a terminal device and a base station is greater than a threshold, or a parameter such as signal strength, a signal-to-noise ratio, or signal quality of received or transmitted data is less than a threshold, the base station controls the terminal device to transmit uplink data at a maximum output power. Similarly, when a distance between the terminal device and the base station is less than the threshold, or the parameter such as signal strength, a signal-to-noise ratio, or signal quality of received or transmitted data is greater than a threshold, the base station controls the terminal device not to transmit data at the maximum output power. For example, maximum output power reduction may be performed. To be specific, the terminal device may be allowed not to transmit uplink data at the maximum transmit power. In some embodiments, whether the terminal device needs to perform maximum power reduction may be based on different modulation schemes of the base station. For example, when a terminal device uses a quadrature phase shift keying (Quadrature Phase Shift Keying, QPSK) modulation scheme, the terminal device may not need to perform maximum power reduction.

In addition, different countries or regions specify, for a terminal device, a radiation value SAR generated when the terminal device is running. It may be understood that the SAR value is an average value of radiation to a main area of a whole body, or an average value of radiation to a main area of a whole body within a period of time. Even if the terminal device performs maximum output power reduction, a requirement for the SAR still needs to be met. Generally, an upper limit value of the SAR is specified in different countries or regions.

In some embodiments, it may be understood that when a total output power of the terminal device meets a first SAR value, an output power of each antenna of the terminal device may be measured, and is usually a maximum output power. It is assumed that the terminal device has four antennas, and output powers of the antennas may be referred to as P0, P1, P2, and P3.

In some embodiments, when the terminal device performs maximum power reduction, the total output power of the terminal device still needs to meet a second SAR value. Herein, the second SAR value may be the same as or different from the first SAR value. In this case, the output powers of the antennas of the terminal device each may be measured, and are separately referred to as P4, P5, P6, and P7. After the maximum power reduction is performed, at least one of P4, P5, P6, and P7 is less than any one of P0, P1, P2, and P3.

In this embodiment, it is assumed that the terminal device transmits data on a non-SRS channel only by using a first antenna. In this application, it may be understood that, at a first moment, when the terminal device needs to transmit data on a non-SRS channel, the terminal device may further reduce an output power of the first antenna to P8, where P8 is less than P4. At a second moment, when the terminal device needs to transmit data on an SRS channel, the terminal device may restore the output power of the first antenna to P0, and other antennas separately transmit data on the SRS channel at output powers of P1, P2, and P3, to ensure that in a period of time or a measurement period, the total output power of the terminal device meets a corresponding SAR value after the maximum power reduction.

In some embodiments, it may be understood that, in a period of time or a measurement period, an average output power of the first antenna is less than P4.

The two dashed lines in (b) in FIG. 1 indicate maximum output powers of antennas T0 and T1. Although the maximum output powers of the antennas T0 and T1 shown in the figure are different, a person skilled in the art can understand that the maximum output powers of the antennas T0 and T1 may also be the same.

To ensure that the SAR value complies with the relevant laws and regulations to meet the electromagnetic power density exposure requirement, as shown by the two solid lines in (b) in FIG. 1, the antennas T0 and T1 reduce respective output powers by performing respective maximum output power reduction. When an output power of an SRS signal is limited, an output power of an uplink channel does not match a receive power of a corresponding downlink channel. That is, channel reciprocity is damaged. Consequently, a signal-to-noise ratio of an SRS channel that is received by the base station decreases. This affects downlink beamforming performance, and also affects a download speed for a user.

It should be noted herein that, in addition to being related to the SAR value, the electromagnetic power density exposure requirement is also affected by a location of the antenna in the UE and a distance between the UE and the user. In addition, as shown in FIG. 1, a person skilled in the art may understand that, due to impact of different circuit hardware designs, different locations in the UE, and different distances between the UE and the user, maximum output power reductions of different antennas may be different even in a same scenario.

In addition, FIG. 1 shows the UE 110 with four antennas, where two antennas are used to simultaneously transmit signals, that is, antenna switch is 2T4R. However, due to different antenna quantities, radio frequency circuit designs, and the like of the UE, there are different cases of antenna switch, such as 2T4R, 1T4R, and 2T4R/1T4R. A person skilled in the art may understand that embodiments of this application apply to any case of antenna switch.

In addition, communication between the UE 110 and the network device 120 may be based on, but is not limited to, a 3G (3rd-Generation, 3rd generation) mobile communications system, a 4G (4th-Generation, 4th generation) mobile communications system, a 5G (5th generation, 5th generation) system, an NR (new radio, new radio) system, or a communications system having a same architecture as the 5G system and another subsequent mobile communications system.

For clear and brief description of the following embodiments, some technical terms are first described briefly.

(1) The UE 110 is user equipment, also referred to as a terminal or a terminal device, and is a device providing voice and/or data connectivity for a user. A common terminal device includes, for example, a vehicle-mounted device, a mobile phone, a tablet computer, a notebook computer, a palmtop computer, a mobile internet device (mobile internet device, MID), a wearable device (for example, including a smartwatch, a smart band, or a pedometer), a personal digital assistant, a portable media player, a navigation device, a video game device, a set-top box, a virtual reality device and/or an augmented reality device, an internet of things device, an industrial control device, a streaming media client device, an e-book, a reading device, a POS terminal, and other devices.

(2) The network device 120, also referred to as a radio access network (Radio Access Network, RAN) device, is a device that connects the user equipment to a wireless network. The network device includes network devices in various communications standards, for example, including but not limited to a base station, an evolved NodeB (evolved NodeB, eNB), a radio network controller (radio network controller, RNC), a NodeB (NodeB, NB), a network device controller (Base Station Controller, BSC), a network device transceiver (Base Transceiver Station, BTS), a home network device (for example, a Home evolved NodeB, or a Home NodeB, HNB), or a baseband unit (BaseBand Unit, BBU). The network device includes network devices in various frequency standards, for example, includes but is not limited to a low-frequency network device and a high-frequency network device.

The following describes an output power control solution used in the conventional technology with reference to FIG.

2(*a*) to FIG. 2(*c*). As described above, in the conventional technology, an output power of each antenna in UE is adjusted by performing maximum output power reduction.

It is assumed that the maximum output power (Maximum Output Power) of each antenna is $P_{cmaxi}$, and the maximum output power reduction corresponding to each antenna is $P\_MPR_i$. After the output power is reduced, each antenna transmits SRS signals at an output power of $P_{cmaxi}-P\_MPR_i$ (herein, i is an antenna number). In addition, other non-SRS signals in current uplink channels PRACH (Physical Random Access Channel, physical random access channel), PUSCH (Physical Uplink Shared Channel, physical uplink shared channel), and PUCCH (Physical Uplink Control Channel, physical uplink control channel) are transmitted at an output power $P_{cmaxi}-P\_MPR_i$ corresponding to an antenna that transmits the other non-SRS signals in the uplink channels PRACH, PUSCH, and PUCCH.

FIG. 2(*a*) is used as an example. A horizontal axis of a coordinate system represents time, and a vertical axis represents signal output powers. The solution shown in FIG. 2(*a*) includes four antennas, and correspondingly, i=0, 1, 2, and 3. FIG. 2(*a*) shows two SRS transmission periods. One SRS transmission period is used as an example. During the period of transmitting an SRS signal, each of the four antennas transmits an SRS signal in turn at a time point t0 to a time point t3, that is, 1T4R. According to a solution in the conventional technology, adjusted SRS signal output powers of the antennas are respectively P0, P1, P2, and P3. For example, an adjusted SRS signal output power of the antenna 0 shown in FIG. 2(*a*) is $P_{cmax0}-P\_MPR_0$.

In addition, a non-SRS signal output power is shown in FIG. 2(*a*) to FIG. 2(*c*) by using a dash-dot line. In the solution shown in FIG. 2(*a*) to FIG. 2(*c*) the other non-SRS signals of the uplink channels PRACH, PUSCH, and PUCCH are transmitted on the antenna 0. Therefore, the other non-SRS signals of the uplink channels PRACH, PUSCH, and PUCCH are transmitted at an SRS signal output power of the antenna 0, that is, the non-SRS signal output power is equal to $P_{cmax0}-P\_MPR_0$. As shown in FIG. 2(*a*) to FIG. 2(*c*), the non-SRS signal output power is consistent with the output power of the antenna 0.

The solution shown in FIG. 2(*b*) includes two antennas, and correspondingly, i=0, and 1. One SRS transmission period is used as an example. During the period of transmitting an SRS signal, each of the two antennas transmits an SRS signal in turn at a time point t0 and a time point t1. According to a solution in the conventional technology, adjusted SRS signal output powers of antennas are respectively P0, and P1. For example, an adjusted SRS signal output power of the antenna 0 shown in FIG. 2(*b*) is $P_{cmax0}-P\_MPR_0$.

In addition, a non-SRS signal output power is shown in FIG. 2(*b*) by using a dash-dot line. In the solution shown in FIG. 2(*b*), the other non-SRS signals of the uplink channels PRACH, PUSCH, and PUCCH are transmitted on the antenna 0. Therefore, the other non-SRS signals of the uplink channels PRACH, PUSCH, and PUCCH are transmitted at an SRS signal output power of the antenna 0, that is, the non-SRS signal output power is equal to $P_{cmax0}-P\_MPR_0$. As shown in FIG. 2(*b*), the non-SRS signal output power is consistent with the output power of the antenna 0.

FIG. 2(*c*) shows a solution in the conventional technology in a 2T4R antenna switch scenario. Similar to FIG. 2(*a*), the solution shown in FIG. 2(*c*) includes four antennas, and correspondingly, i=0, 1, 2, and 3. FIG. 2(*c*) shows two SRS transmission periods. One SRS transmission period is used as an example. During the period of transmitting an SRS signal, every two the four antennas transmit SRS signals in pairs in turn at a time point t0 and a time point t1. According to a solution in the conventional technology, adjusted SRS signal output powers of the antennas are respectively P0, P1, P2, and P3. For example, an adjusted SRS signal output power of the antenna 0 shown in FIG. 2(*c*) is $P_{cmax0}-P\_MPR_0$.

It should be noted herein that, in FIG. 2(*c*), output powers of two antennas that originally transmit SRS signals through code division multiplexing at a moment t0 and a moment t1 are separately displayed. However, this is merely for a purpose of clear display and ease of understanding, and does not mean that the two antennas transmit SRS signals at different time points.

Similarly, FIG. 2(*c*) shows an example in which non-SRS signals of uplink channels PRACH, PUSCH, and PUCCH are transmitted on the antenna 0. During actual application, other non-SRS signals of the uplink channels PRACH, PUSCH, and PUCCH may be transmitted on any antenna, and a corresponding non-SRS signal output power is equal to the SRS signal output power of the antenna. In addition, signal transmission of the uplink channels PRACH, PUSCH, and PUCCH in FIG. 2(*c*) shows only a scenario in which a signal is transmitted on one antenna. However, a person skilled in the art can understand that actually, signals may also be transmitted by two antennas.

It should be noted that SRS periods shown in FIG. 2(*a*) to FIG. 2(*c*) may be regular SRS signal transmission periods, or may be irregular SRS signal transmission periods.

FIG. 2(*a*) to FIG. 2(*c*) show an example in which the non-SRS signals of the uplink channels PRACH, PUSCH, and PUCCH are transmitted on the antenna 0. During actual application, other non-SRS signals of the uplink channels PRACH, PUSCH, and PUCCH may be transmitted on any antenna, and a corresponding non-SRS signal output power is equal to the SRS signal output power of the antenna.

In addition, FIG. 2(*a*) to FIG. 2(*c*) are described by using the maximum output power $P_{cmax}$ of each antenna. However, a person skilled in the art may understand that there are many limitations and requirements on power control of the UE, for example, a maximum power reduction (Maximum Power Reduction, MPR) or an additional maximum power reduction (Additional Maximum Power Reduction, AMPR). Therefore, in an actual application scenario, the maximum output power is generally limited, and an actual transmit power is less than or equal to the $P_{cmax}$ according to a power control requirement. Similarly, the maximum output power reduction P_MPR of each antenna varies according to a location of the antenna in the UE and a design of a radio frequency circuit.

FIG. 2(*a*) to FIG. 2(*c*) show an output power control solution used in the conventional technology by using 1T4R, 1T2R, and 2T4R as examples. However, a person skilled in the art may understand that controlling of an output power of an antenna is also performed in a same manner in an antenna switch scenario such as 1T4R/2T4R (switchable).

As described above, by using the solution in the conventional technology shown in FIG. 2(*a*) to FIG. 2(*c*), an output power of each antenna decreases after adjustment. Consequently, a signal-to-noise ratio of an SRS channel that is received by a base station decreases. This affects downlink beamforming performance, and affects a download speed for a user.

The following describes in detail the technical solutions of this application by using specific embodiments. The following specific embodiments may be mutually combined, and same or similar concepts or processes are not repeatedly described in some embodiments.

Figure 3:
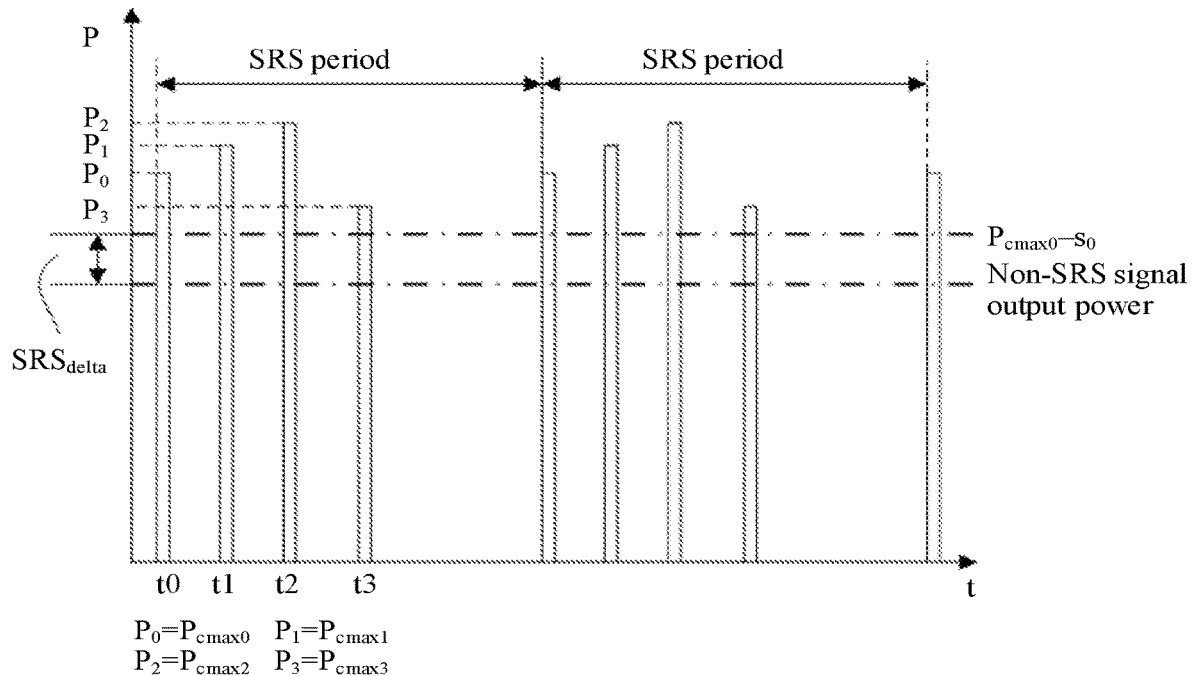
FIG. 3 is a schematic diagram of a method for controlling an output power of an antenna according to an embodiment of this application.

FIG. 3 is a schematic diagram of a method for controlling an output power of an antenna according to an embodiment of this application. In the method for controlling an output power of an antenna according to the embodiment shown in FIG. 3 of this application, an SRS signal output power of each antenna is not reduced. Each antenna of at least one antenna of UE transmits an SRS signal to a base station at a maximum output power, and at the same time, a specific antenna of the at least one antenna transmits a non-SRS signal to the base station, and adjusts a non-SRS signal output power, so that the non-SRS signal output power is less than a difference between a maximum output power and a maximum output power reduction of the antenna, that is, the non-SRS signal output power is additionally reduced on the basis of the difference between the maximum output power and the maximum output power reduction, so that an overall transmit power of the UE meets an SAR value specification, thereby meeting an electromagnetic power density exposure requirement.

Figure 2A:
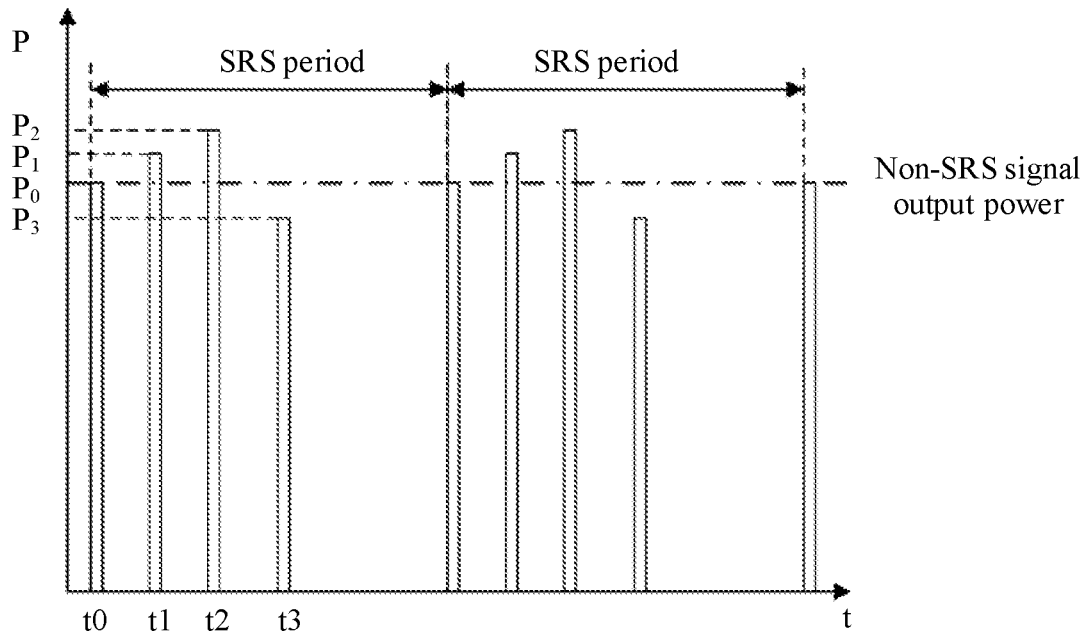
FIG. 2(a) to FIG. 2(c) are a schematic diagram of controlling an output power of an antenna according to the conventional technology.
Figure 2B:
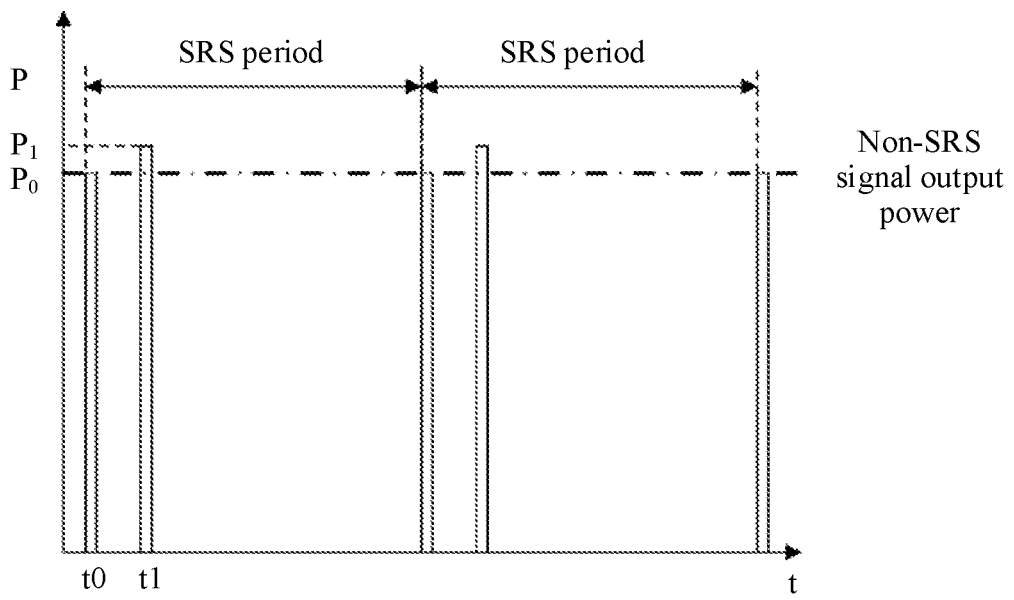
Figure 2C:
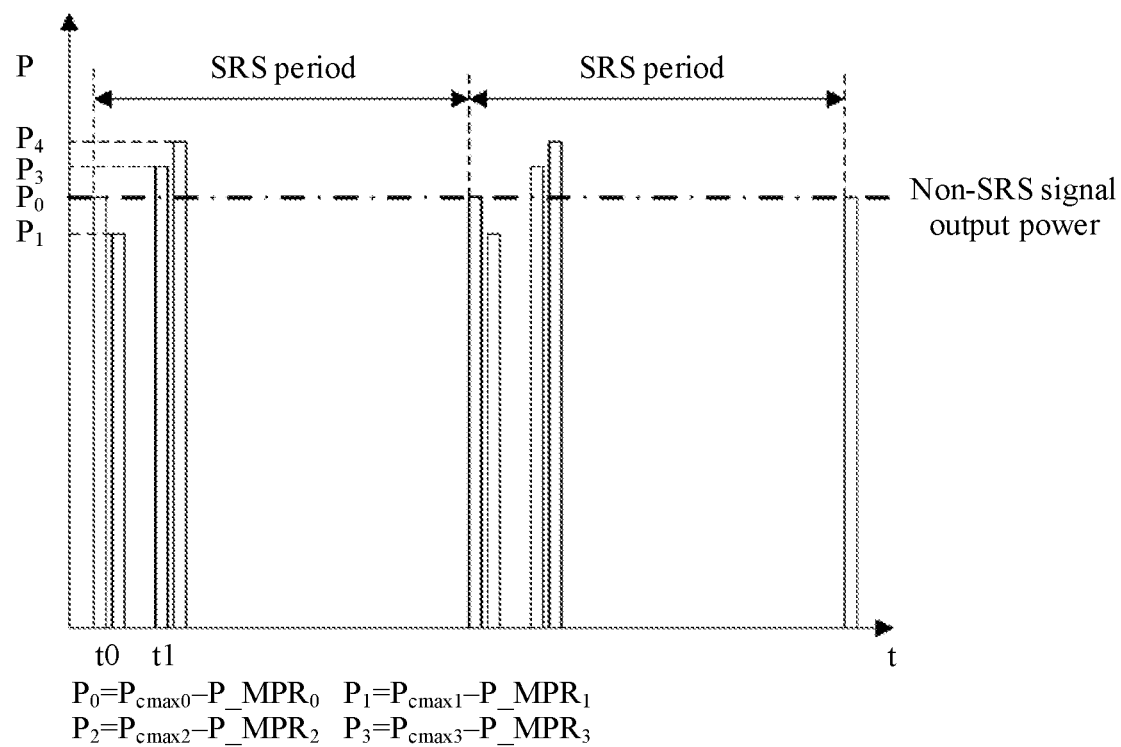

Compared with the solution of reducing the output power of each antenna shown in FIG. 2(a) to FIG. 2(c), according to the embodiment shown in FIG. 3 of this application, the SRS signal output power is not reduced, and the SRS signal is transmitted at the maximum output power. Therefore, channel quality is not affected, thereby ensuring good channel reciprocity.

Specifically, the antenna power adjustment solution in an embodiment of this application is still described by using a 1T4R antenna switch scenario. As shown in FIG. 3, four antennas sequentially transmit SRS signals to a base station in an SRS signal transmission period, where the output power for transmitting the SRS signal by each antenna is the maximum output power $P_{cmaxi}$ of each antenna. For other non-SRS signals of uplink channels PRACH, PUSCH, and PUCCH, if the signals are still transmitted at a power value of the maximum output power minus the maximum output power reduction ($P_{cmaxi}$–P_MPR$_i$), an SAR value is excessive. As a result, the electromagnetic power density exposure requirement cannot be met.

Therefore, to prevent the SAR value from being excessive, an output power of the other non-SRS signals of the uplink channels PRACH, PUSCH, and PUCCH needs to be further reduced by one value on the basis of the maximum output power minus the maximum output power reduction ($P_{cmaxi}$–P_MPR$_i$), to meet the electromagnetic power density exposure requirement. The reduced value is referred to as a power decrease value $SRS_{delta}$.

Herein, assuming that the maximum output power, the P-MPR, a proportion of SRS signals during the SRS period of each antenna, and a quantity of times for performing antenna switch are respectively $P_{cmaxi}$, $s_i$, $r_i$, and T, the power decrease value $SRS_{delta}$ may be calculated according to the following formula (1):

$$\Sigma_{i=0}^{T-1}(P_{cmaxi}-s_i) \times r_i = SRS_{delta} \times (1-\Sigma_{i=0}^{T-1} r_i) \quad (1),\text{ where}$$

T is set to different values according to different antenna switch scenarios. For example, in a 1T4R antenna switch scenario shown in FIG. 3, T=4. However, in a 1T2R scenario, T=2. The proportion of the SRS signals during the SRS period is a proportion of a quantity of symbols of the transmitted SRS signals to a total quantity of symbols of all signals including the SRS signals and non-SRS signals during the SRS period.

In the foregoing formula, on a left side of the equal sign indicates an output power that is "excessive" because an SRS signal output power is not reduced, and on a right side of the equal sign indicates a power that needs to be reduced and that corresponds to the other non-SRS signals of the uplink channels PRACH, PUSCH, and PUCCH. The two are equal, to ensure that the SAR value complies with relevant laws and regulations to meet the electromagnetic power density exposure requirement.

It should be noted that, because different antennas have different locations in the user equipment, actually, contribution of an output power of each antenna to the SAR value is different. Therefore, the foregoing formula is made on the premise that the contribution of the "excessive" SRS signal output power on each antenna to the SAR value is the same as the contribution of a reduced output power of the other non-SRS signals to the SAR value.

The following describes the foregoing formula by using a specific example. According to the foregoing formula, data shown in Table 1 is obtained through calculation.

It should be noted herein that, for ease of calculation and understanding, the following Table 1 is obtained when it is assumed that SRS signals are transmitted periodically and regularly, and the maximum output power and the maximum output power reduction of each antenna are the same as those of one another.

TABLE 1

| Antenna switch | SRS period (ms) | Quantity of SRS symbols | Total quantity of symbols | SRS proportion | Power decrease value | |
|---|---|---|---|---|---|---|
| | | | | | P-MPR: 3 dB | P-MPR: 6 dB |
| 2T4R | 40 | 2 | 1120 | 0.18% | 0.0077761 | 0.0233702 |
| | 20 | 2 | 560 | 0.36% | 0.0155941 | 0.0469512 |
| | 10 | 2 | 280 | 0.72% | 0.0313571 | 0.0947589 |
| | 5 | 2 | 140 | 1.43% | 0.0634018 | 0.1930512 |
| 1T4R | 40 | 4 | 1120 | 0.18% | 0.0155941 | 0.0469512 |
| | 20 | 4 | 560 | 0.36% | 0.0313571 | 0.0947589 |
| | 10 | 4 | 280 | 0.72% | 0.0634018 | 0.1930512 |
| | 5 | 4 | 140 | 1.43% | 0.1296498 | 0.4011722 |

A case in which antenna switch is 2T4R and an SRS period is 40 ms in Table 1 is used as an example. Two of four antennas of UE simultaneously transmit signals, and transmit SRS signals to a base station within the SRS period of 40 ms. That is, SRS signals are transmitted twice during one SRS period, and a corresponding quantity of SRS symbols is 2. The total quantity of symbols in Table 1 means a total quantity of symbols of all signals including SRS signals and non-SRS signals during one SRS period. If the total quantity of symbols is 1120, the proportion of the quantity of symbols of the SRS signals is 0.18%.

Assuming that the maximum output power of each antenna is 23 dBm, and signal output power is equal to 200 mW. If a P-MPR is 3 dB, an upper limit of the output power of the antenna is 20 dBm, that is, 100 mW. Therefore, a power decrease value $SRS_{delta}$ that may be obtained through calculation according to formula (1) is 0.0077761 dB. Similarly, when the P-MPR is 6 dB, a power decrease value $SRS_{delta}$ obtained through calculation is 0.0233702 dB.

For example, other non-SRS signals of the uplink channels PRACH, PUSCH, and PUCCH are transmitted on an antenna 0. If a power decrease value is not considered, as shown by a dash-dot line above in FIG. 3, a non-SRS signal output power on the antenna 0 is $P_{cmax0}$–P_MPR$_0$, that is, a difference between the maximum output power and the maximum output power reduction. According to the solution in an embodiment of this application shown in FIG. 3, an output power of other non-SRS signals of the uplink channels PRACH, PUSCH, and PUCCH is reduced by a power decrease value $SRS_{delta}$ determined according to the foregoing method on a basis of $P_{cmax0}$–P_MPR$_0$, and a transmit power of the non-SRS signals of which an output power is reduced is shown by a dash-dot line below in FIG. 3.

In the embodiment shown in FIG. 3, an example in which transmission through the uplink channels PRACH, PUSCH, and PUCCH is performed on the antenna 0 is still used. However, a person skilled in the art can understand that other non-SRS signals of the uplink channels PRACH, PUSCH, and PUCCH may be transmitted on any antenna, and a corresponding non-SRS signal output power is equal to $P_{cmaxi}$–P_MPR$_i$–SRS$_{delta}$.

In addition, in a 2T4R antenna switch scenario, other signals of the uplink channels PRACH, PUSCH, and PUCCH may be transmitted on two antennas, and a person skilled in the art may also obtain the power decrease value $SRS_{delta}$ according to the foregoing idea. In this case, the power decrease value may be adjusted only on one antenna, or the power decrease value may be separately allocated to the two antennas.

As described above, according to the method for controlling an output power of an antenna in an embodiment of this application, an SRS signal is transmitted at a maximum output power of each antenna, and a non-SRS signal output power is adjusted. An output power of an uplink channel can match a receive power of a corresponding downlink channel. Therefore, reciprocity between uplink and downlink channels can be ensured.

Figure 4:
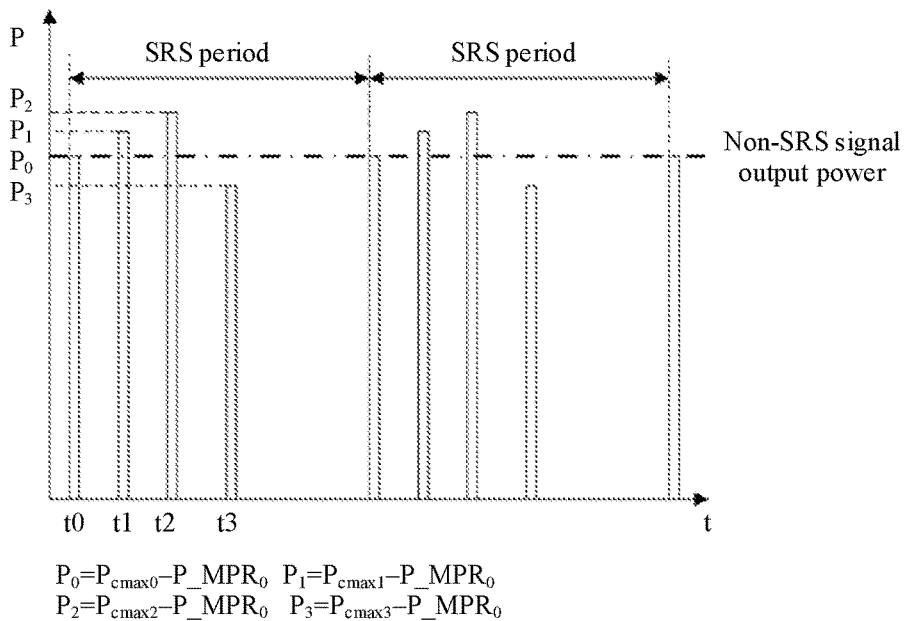
FIG. 4 is a schematic diagram of a method for controlling an output power of an antenna according to an embodiment of this application.

FIG. 4 is a schematic diagram of a method for controlling an output power of an antenna according to another embodiment of this application. According to the embodiment shown in FIG. 4 of this application, a plurality of antennas of UE reduce SRS signal output powers by a same maximum output power reduction.

Specifically, each antenna of the plurality of antennas of the UE transmits an SRS signal to a base station at a respective SRS signal output power. The SRS signal output power of each antenna is a difference between a maximum output power of the antenna and a maximum output power reduction of a first antenna, to meet an electromagnetic power density exposure requirement. The maximum output power reduction of the first antenna is greater than a maximum output power reduction of each antenna of the plurality of antennas other than the first antenna. A non-SRS signal is transmitted from the first antenna, and a non-SRS signal output power is equal to an SRS signal output power of the first antenna.

Specifically, the antenna power adjustment method shown in FIG. 4 of this application is still described by using a 1T4R antenna switch scenario. Similarly, the four antennas sequentially transmit SRS signals to the base station during an SRS period. The maximum output power of each antenna is $P_{cmaxi}$ (i=0, 1, 2, 3), and the maximum output power reduction of each antenna is P_MPR$_i$.

As described above, in an actual application scenario, maximum output power reductions of the four antennas may be different from each other. Therefore, if a greatest value of the maximum output power reductions of the four antennas is selected to adjust the output power of each antenna, an electromagnetic power density exposure requirement can be definitely met. In the embodiment shown in FIG. 4, a maximum output power reduction P_MPR$_0$ of an antenna 0 is the largest among those of the four antennas. Therefore, the maximum output power reduction P_MPR$_0$ is used to adjust the SRS output power of each antenna, and the adjusted SRS signal output power of each antenna is $P_{cmaxi}$–P_MPR$_0$. Herein, an example in which the maximum output power reduction P_MPR$_0$ of the antenna 0 has a greatest value from values of the four antennas. However, a person skilled in the art can understand that, in an actual application scenario, an antenna of which a maximum output power reduction has a greatest value may be any one of the plurality of antennas of the UE.

In addition, other non-SRS signals of uplink channels PRACH, PUSCH, and PUCCH are also transmitted from the antenna 0, and the output power is the same as the SRS signal output power of the antenna 0 ($P_{cmax0}$–P_MPR$_0$). Herein, an example in which transmission through the uplink channels PRACH, PUSCH, and PUCCH is performed on the antenna 0 is used. However, a person skilled in the art can understand that, in an actual application scenario, other non-SRS signals of the uplink channels PRACH, PUSCH, and PUCCH may be transmitted on any antenna.

As described above, according to the method for controlling an output power of an antenna in the embodiment shown in FIG. 4 of this application, an SRS signal output power is adjusted by a same maximum output power reduction. Therefore, while an SAR value complies with a requirement of relevant laws and regulations, an output power of an uplink channel can further match a receive power of a corresponding downlink channel, thereby ensuring good reciprocity between uplink and downlink channels.

Figure 5:
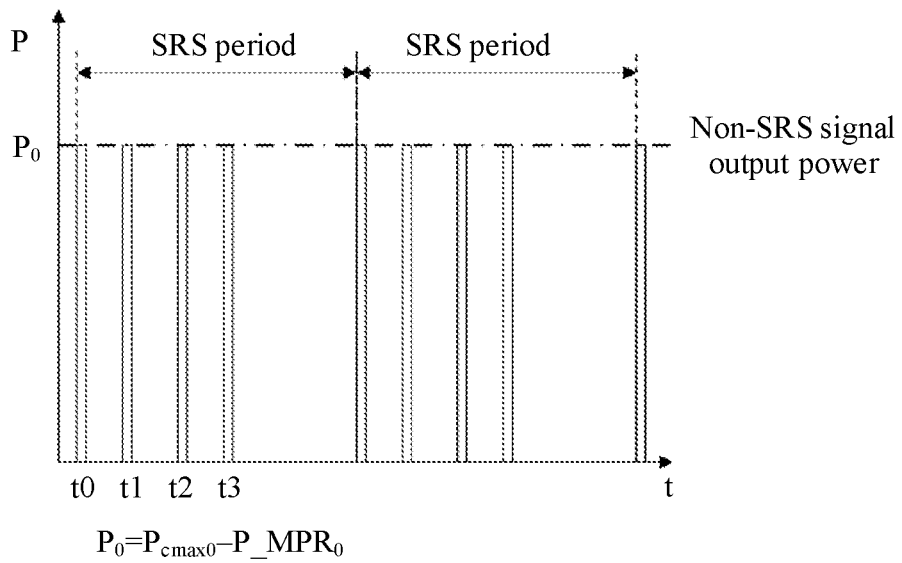
FIG. 5 is a schematic diagram of a method for controlling an output power of an antenna according to an embodiment of this application.

FIG. 5 is a schematic diagram of a method for controlling an output power of an antenna according to still another embodiment of this application. According to the embodiment shown in FIG. 5 of this application, each of a plurality of antennas of UE transmits an SRS signal and a non-SRS signal at a same power.

Specifically, each antenna transmits the SRS signal to a base station at an SRS signal output power of a specific antenna of the plurality of antennas, where the SRS signal output power is a difference between a maximum output power and a maximum output power reduction of the antenna, to meet an electromagnetic power density exposure requirement. In addition, a non-SRS signal is transmitted from a same antenna that transmits the SRS signal, and a non-SRS signal output power is equal to the SRS signal output power.

Specifically, the antenna power adjustment solution shown in the embodiment in FIG. 5 of this application is still described by using a 1T4R antenna switch scenario. As shown in FIG. 5, similarly, four antennas sequentially transmit SRS signals to the base station during an SRS period. The SRS signal output power of each antenna is a difference between a maximum output power and a maximum output power reduction of an antenna 0 ($P_{cmax0}$–s$_0$). A non-SRS signal output power of uplink channels PRACH, PUSCH, and PUCCH is the same as the SRS signal output power, that is, also equal to $P_{cmax0}$–s$_0$.

In the embodiment shown in FIG. 5, during the SRS period, an antenna that first transmits the SRS signal to the base station is the antenna 0, and then the other three antennas transmit SRS signals at the same output power as the antenna 0, and the non-SRS signal is also transmitted from the antenna 0.

However, a person skilled in the art can understand that, in an actual application scenario, any one of a plurality of antennas may first transmit an SRS signal. Therefore, according to the still another embodiment of this application, during the SRS period, the SRS signal output power and the non-SRS signal output power are determined by using the antenna that first transmits an SRS signal to the base station as a reference.

As described above, according to the method for controlling an output power of an antenna in the embodiment shown in FIG. 5 of this application, the SRS signal output power is consistent with the non-SRS signal output power. Therefore, an SAR value can be made to meet a requirement of related laws and regulations in a relatively simple manner.

In FIG. 3 to FIG. 5, the methods for controlling an output power of an antenna of this application are described by using 1T4R antenna switch scenarios as examples. However, a person skilled in the art may understand that, in an antenna switch scenario such as 2T4R, or 1T4R/2T4R (switchable), or other antenna switch scenarios that emerge with continuous evolution of technologies, controlling of an output power of an antenna can also be performed in the same manner.

Next, procedures of the methods for controlling an output power of an antenna according to this application are described with reference to FIG. 6 to FIG. 8. It should be noted that, although steps of the methods for control an output power are presented in a specific order in embodiments of this application, a sequence of the steps may be changed in different embodiments.

Figure 6:
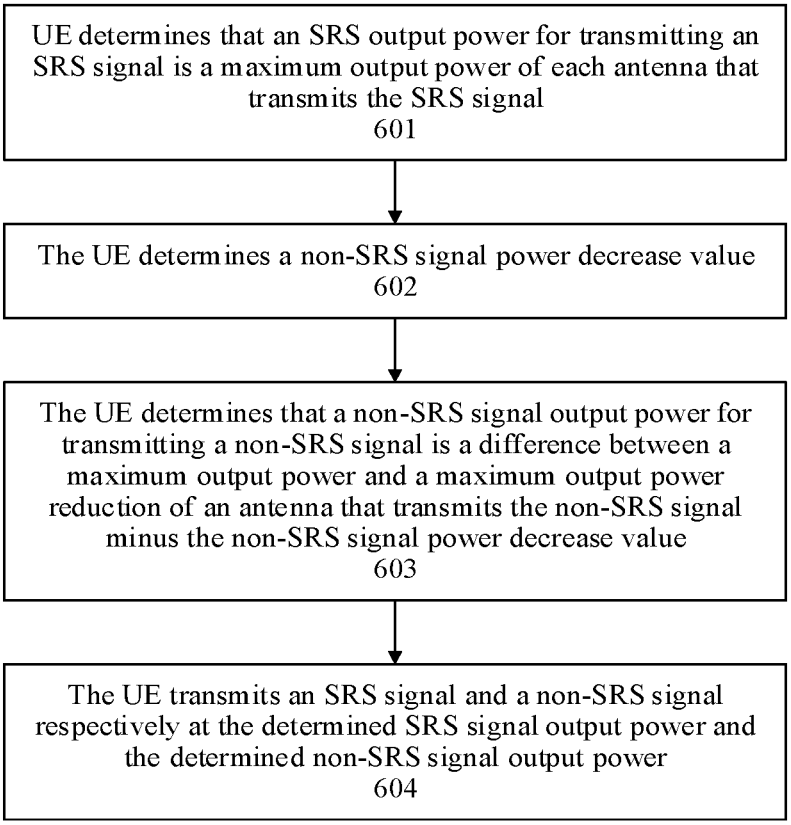
FIG. 6 is a flowchart of a method for controlling an output power of an antenna according to an embodiment of this application.

FIG. 6 is a flowchart of a method for controlling an output power of an antenna for UE according to an embodiment of this application. The procedure of the method shown in FIG. 6 corresponds to the embodiment of this application shown in FIG. 3. The method shown in FIG. 6 includes the following steps:

In step 601, the UE determines that an SRS output power for transmitting an SRS signal is a maximum output power of each antenna that transmits the SRS signal. Refer to FIG. 3. The output power for transmitting the SRS signal by each antenna of the UE is the maximum output power $P_{cmaxi}$ of each antenna.

The maximum output power of each antenna is usually configured in the UE as an original initial parameter before delivery. Therefore, in some implementations, the UE may determine the maximum output power of each antenna based on, for example, factory defaults. In an antenna switch scenario, each antenna transmits an SRS signal. Therefore, an SRS output power of each antenna of the UE is the maximum output power of each antenna.

In some implementations, the base station may notify, by sending SRS configuration information to the UE, the UE whether the UE is supported in transmitting the SRS signal at the maximum output power of each antenna that transmits the SRS signal. Therefore, the UE may determine, based on scheduling of the base station, for example, based on the SRS configuration information sent by the base station, that the SRS output power for transmitting the SRS signal is the maximum output power of each antenna that transmits the SRS signal.

In step 602, the UE determines a non-SRS signal power decrease value.

Refer to the foregoing description of FIG. 3. In some implementations, the UE may calculate the non-SRS signal power decrease value. The non-SRS signal power decrease value is calculated based on a maximum output power of an antenna, a P-MPR of the antenna, a quantity of times for performing antenna switch, and a proportion of SRS signals during an SRS period of the antenna. The maximum output power, and the P-MPR of the antenna, and the quantity of times for performing antenna switch are usually used as original initial parameters and have been configured in the UE before delivery, and only the proportion of SRS signals during the SRS period needs to be obtained. In some implementations, the UE may count a quantity of symbols of SRS signals transmitted, and a quantity of symbols of non-SRS signals transmitted during an SRS period, to further calculate a proportion of the quantity of symbols of the SRS signals to a total quantity of symbols of all signals including the SRS signals and the non-SRS signals.

Specific calculation of the non-SRS signal power decrease value is shown in the foregoing formula (1), and details are not described herein again.

In step 603, the UE determines that a non-SRS signal output power for transmitting the non-SRS signal is a difference between a maximum output power and a maximum output power reduction of an antenna that transmits the non-SRS signal minus the non-SRS signal power decrease value.

In some implementations, the UE selects an antenna that transmits a non-SRS signal from a plurality of antennas, and calculates a non-SRS signal output power as $P_{cmaxi}-P\_MPR_i-SRS_{delta}$ based on a maximum output power and a maximum output power reduction of the antenna that transmits the non-SRS signal, and the power decrease value calculated in step 602.

Specifically, refer to the description of FIG. 3. Details are not described herein again.

In step 604, the UE transmits an SRS signal and a non-SRS signal respectively at the SRS signal output power and the non-SRS signal output power determined in steps 601 to 603.

The UE configures the SRS signal output power and the non-SRS signal output power that are calculated based on the foregoing steps for corresponding antenna ports, and then each antenna transmits the SRS signal or the non-SRS signal at the corresponding SRS signal output power and non-SRS signal output power.

According to the method for controlling an output power of an antenna in an embodiment of this application shown in FIG. 6, an SRS signal is transmitted at a maximum output power of each antenna, and a non-SRS signal output power is reduced, so that an SAR value can be reduced to meet an electromagnetic power density exposure requirement, and an output power of an uplink channel can match a receive power of a corresponding downlink channel. Therefore, reciprocity between the uplink and downlink channels can be ensured.

Figure 7:
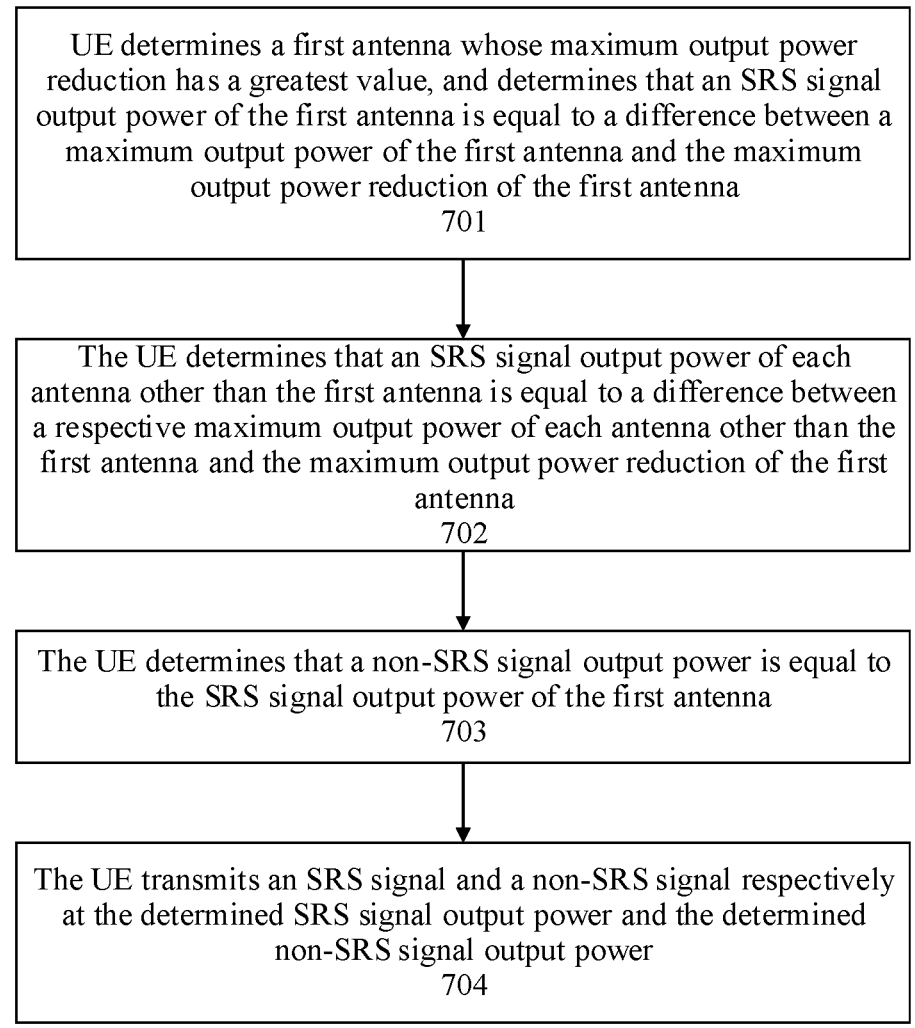
FIG. 7 is a flowchart of a method for controlling an output power of an antenna according to an embodiment of this application.

FIG. 7 is a flowchart of a method for controlling an output power of an antenna for UE according to another embodiment of this application. The procedure of the method shown in FIG. 7 corresponds to the embodiment of this application shown in FIG. 4. The method shown in FIG. 7 includes the following steps:

In step 701, the UE determines a first antenna whose maximum output power reduction has a greatest value, and determines that an SRS signal output power of the first antenna is equal to a difference between a maximum output power of the first antenna and the maximum output power reduction of the first antenna. Refer to FIG. 4. For example, the first antenna is an antenna 0, and an SRS signal output power of the antenna 0 is $P_{cmax0}-P\_MPR_0$.

A maximum output power and a maximum output power reduction of each antenna are usually used as original initial parameters and have been configured in the UE before delivery. Therefore, in some implementations, the UE may select, based on, for example, factory settings, a first antenna whose maximum output power reduction has a greatest value from values of a plurality of antennas, and calculate a difference between a maximum output power and the maximum output power reduction of the first antenna.

In step 702, the UE determines that an SRS signal output power of each antenna other than the first antenna is equal to a difference between a respective maximum output power of each antenna other than the first antenna and the maximum output power reduction of the first antenna.

For each antenna other than the first antenna, the UE adjusts the SRS signal output power of each antenna other than the first antenna based on the maximum output power reduction of the first antenna, and calculates the difference between the respective maximum output power of each antenna other than the first antenna and the maximum output power reduction of the first antenna. Refer to FIG. 4. For example, the SRS signal output power of each antenna other than the first antenna is $P_{cmaxi}-P\_MPR_0$.

In step 703, the UE determines that a non-SRS signal output power is equal to the SRS signal output power of the first antenna. Refer to FIG. 4. For example, the non-SRS signal output power is equal to the SRS signal output power $P_{cmax0}-P\_MPR_0$ of the first antenna, namely, the antenna 0. According to the SRS signal output power of the first antenna that is calculated in step 701, the UE configures the non-SRS signal output power as the difference between the maximum output power and the maximum output power reduction of the first antenna.

Finally, in step 704, the UE transmits an SRS signal and a non-SRS signal respectively at the SRS signal output power and the non-SRS signal output power determined in steps 701 to 703.

The UE configures the SRS signal output power and the non-SRS signal output power that are calculated based on the foregoing steps for corresponding antenna ports, and then each antenna transmits the SRS signal or the non-SRS signal at the corresponding SRS signal output power and non-SRS signal output power.

According to the method for controlling an output power of an antenna in the embodiment shown in FIG. 7, an SRS signal output power is adjusted by a same maximum output power reduction. Therefore, while an SAR value complies with a requirement of relevant laws and regulations, an output power of an uplink channel can further match a receive power of a corresponding downlink channel, thereby ensuring good reciprocity between uplink and downlink channels.

Figure 8:
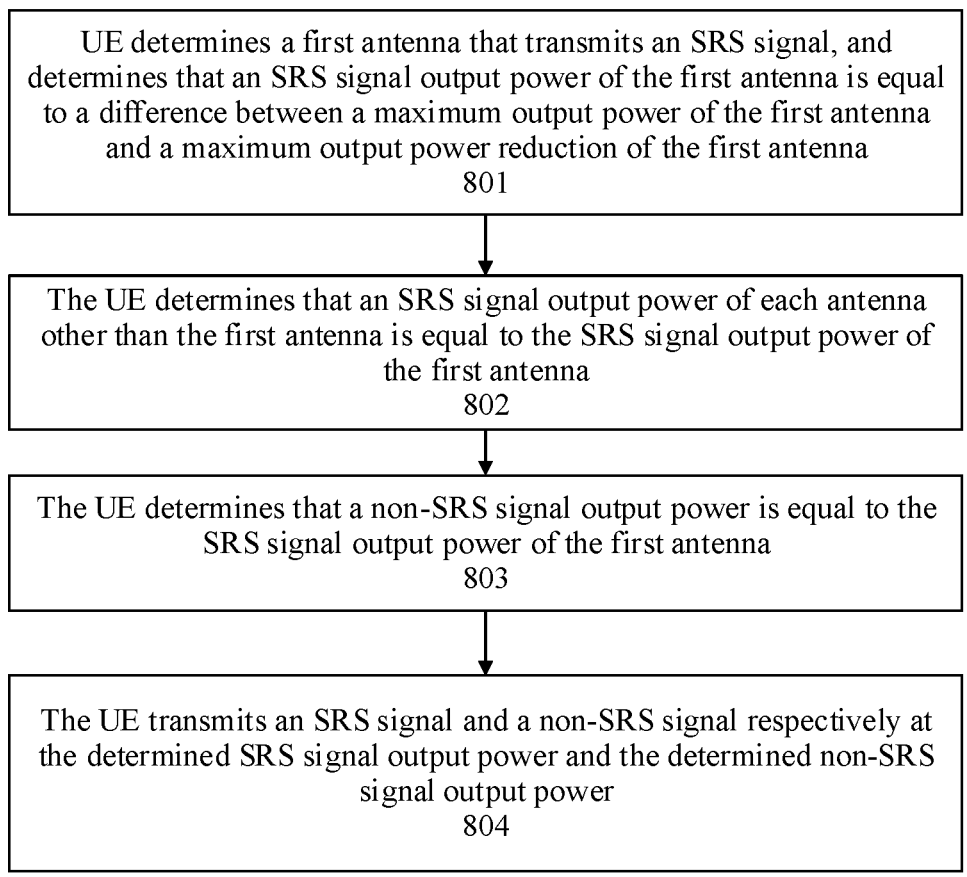
FIG. 8 is a flowchart of a method for controlling an output power of an antenna according to an embodiment of this application.

FIG. 8 is a flowchart of a method for controlling an output power of an antenna for UE according to still another embodiment of this application. The procedure of the method shown in FIG. 8 corresponds to the embodiment of this application shown in FIG. 5. The method shown in FIG. 8 includes the following steps:

In step 801, the UE determines a first antenna that transmits an SRS signal, and determines that an SRS signal output power of the first antenna is equal to a difference between a maximum output power of the first antenna and a maximum output power reduction of the first antenna.

In some implementations, if a transmission order of a plurality of antennas is fixed, the UE may select the first antenna that transmits the SRS signal from the plurality of antennas that transmit SRS signals in the fixed order. Alternatively, the UE may select the first antenna based on an actual SRS signal transmission order.

Similarly, a maximum output power and a maximum output power reduction of each antenna are usually used as original initial parameters and have been configured in the UE before delivery. Therefore, in some implementations, the UE may calculate the difference between the maximum output power and the maximum output power reduction of the first antenna based on, for example, factory settings.

Refer to FIG. 5. For example, the first antenna that transmits the SRS signal is an antenna 0, and therefore, an SRS signal output power of the antenna 0 is equal to a difference between a maximum output power of the antenna 0 and a maximum output power reduction of the antenna 0, that is, $P_{cmax0}-P\_MPR_0$.

In step 802, the UE determines that an SRS signal output power of each antenna other than the first antenna is equal to the SRS signal output power of the first antenna.

For each antenna other than the first antenna, the UE uses the difference between the maximum output power and the maximum output power reduction of the first antenna calculated in step 801 as the SRS signal output power of each antenna other than the first antenna. Similarly, refer to FIG. 5. For example, the signal output power of each antenna other than the first antenna is also equal to $P_{cmax0}-P\_MPR_0$.

In step 803, the UE determines that a non-SRS signal output power is equal to the SRS signal output power of the first antenna. Similarly, the UE uses the difference between the maximum output power and the maximum output power reduction of the first antenna calculated in step 801 as the non-SRS signal output power. Refer to FIG. 5. For example, the non-SRS signal output power is equal to $P_{cmax0}-P\_MPR_0$.

Finally, in step 804, the UE transmits an SRS signal and a non-SRS signal respectively at the SRS signal output power and the non-SRS signal output power determined in steps 801 to 803.

The UE configures the SRS signal output power and the non-SRS signal output power that are calculated based on the foregoing steps for corresponding antenna ports, and then each antenna transmits the SRS signal or the non-SRS signal at the corresponding SRS signal output power and non-SRS signal output power.

According to the method for controlling an output power of an antenna in the embodiment shown in FIG. 8, the SRS signal output power is consistent with the non-SRS signal output power. Therefore, an SAR value can be made to meet a requirement of related laws and regulations in a relatively simple manner.

The foregoing describes in detail the technical solution for controlling an output power of an antenna in this application by using some specific embodiments.

Further, it is known that SRS resources configured by a network device for UE have different classes including antenna switching (Antenna Switching, AS), codebook (Codebook, CB), beam management (Beam management, BM), and non-codebook (Non Codebook, NCB), and usages. In an actual network environment, an SRS resource often switches between a CB SRS resource and an AS SRS resource for reuse to save SRS resources. A specific class and usage of an SRS resource and whether the SRS resource can be reused are shown in the following Table 2.

TABLE 2

| SRS class | AS | CB | NCB | BM |
|---|---|---|---|---|
| Usage | Downlink beamforming | Uplink detection | Uplink beamforming | Uplink beam management |
| Multiplexed or not | This SRS resource can switch between a CB SRS resource and an AS SRS resource | This SRS resource can switch between a CB SRS resource and an AS SRS resource | No | No |

Therefore, when an SRS resource does not switch between an AS SRS resource and a CB SRS resource for reuse, or an SRS resource switches between an AS SRS resource and a CB SRS resource for reuse, methods for controlling an output power of an antenna may be different.

Table 3 below shows impacts of whether SAR is reduced on an AS SRS resource or a CB SRS resource in cases in which an SRS resource does not switch between an AS SRS resource and a CB SRS resource for reuse, or an SRS resource switches between an AS SRS resource and a CB SRS resource for reuse. It can be learned from Table 3 that, when an SRS resource does not switch between an AS SRS resource and a CB SRS resource for reuse, or an SRS resource switches between an AS SRS resource and a CB SRS resource for reuse, whether an SRS signal is transmitted at a maximum output power of each antenna has different impacts on signal quality.

TABLE 3

| | | An SRS resource switches between an AS SRS resource and a CB SRS resource for reuse | An SRS resource does not switch between an AS SRS resource and a CB SRS resource for reuse |
|---|---|---|---|
| An SRS signal is transmitted at an output power of a difference between a maximum output power and a maximum output power reduction of each antenna | AS | Poor reciprocity and performance | Poor reciprocity and performance |
| | CB | Good | Good |
| An SRS signal is transmitted at the maximum output power of each antenna | AS | Good | Good |
| | CB | MCS estimations are relatively high | Good |

Optionally, in some implementations of this application, when an SRS resource does not switch between an AS SRS resource and a CB SRS resource for reuse, or an SRS resource switches between an AS SRS resource and a CB SRS resource for reuse, an SRS signal is transmitted at a maximum output power of each antenna. That is, during an SRS period, each antenna of the user equipment transmits an SRS signal to a base station at the maximum output power, and a specific antenna of the user equipment transmits a non-SRS signal to the base station, a non-SRS signal output power is equal to a difference between the maximum output power and the maximum output power reduction of the antenna minus a non-SRS signal power decrease value, so that an SAR value complies with related laws and regulations to meet an electromagnetic power density exposure requirement. This manner is described in detail above with reference to FIG. 3 and FIG. 6, and details are not described herein again.

However, as shown in Table 3, in the case in which an SRS resource switches between an AS SRS resource and a CB SRS resource for reuse, if an SRS signal is transmitted at the maximum output power of each antenna, MCS (Modulation and Coding Scheme, modulation and coding scheme) for a CB SRS signal is relatively high. In this case, the base station may schedule the UE to perform compensation to achieve uplink adaptive scheduling. That the base station schedules the UE to perform compensation is specifically described below.

Optionally, in some implementations of this application, if an SRS resource switches between an AS SRS resource and a CB SRS resource for reuse, an SRS signal may be transmitted at an output power of a difference between the maximum output power and the maximum output power reduction of each antenna. This is consistent with the solution in the conventional technology shown in FIG. 2(a) to FIG. 2(c), and details are not described herein again.

Optionally, in some implementations of this application, if an SRS resource does not switch between an AS SRS resource and a CB SRS resource for reuse, the AS SRS signal may be transmitted the maximum output power of each antenna, and the CB SRS signal may be transmitted at an output power of a difference between the maximum output power and the maximum output power reduction of each antenna.

Figure 9:
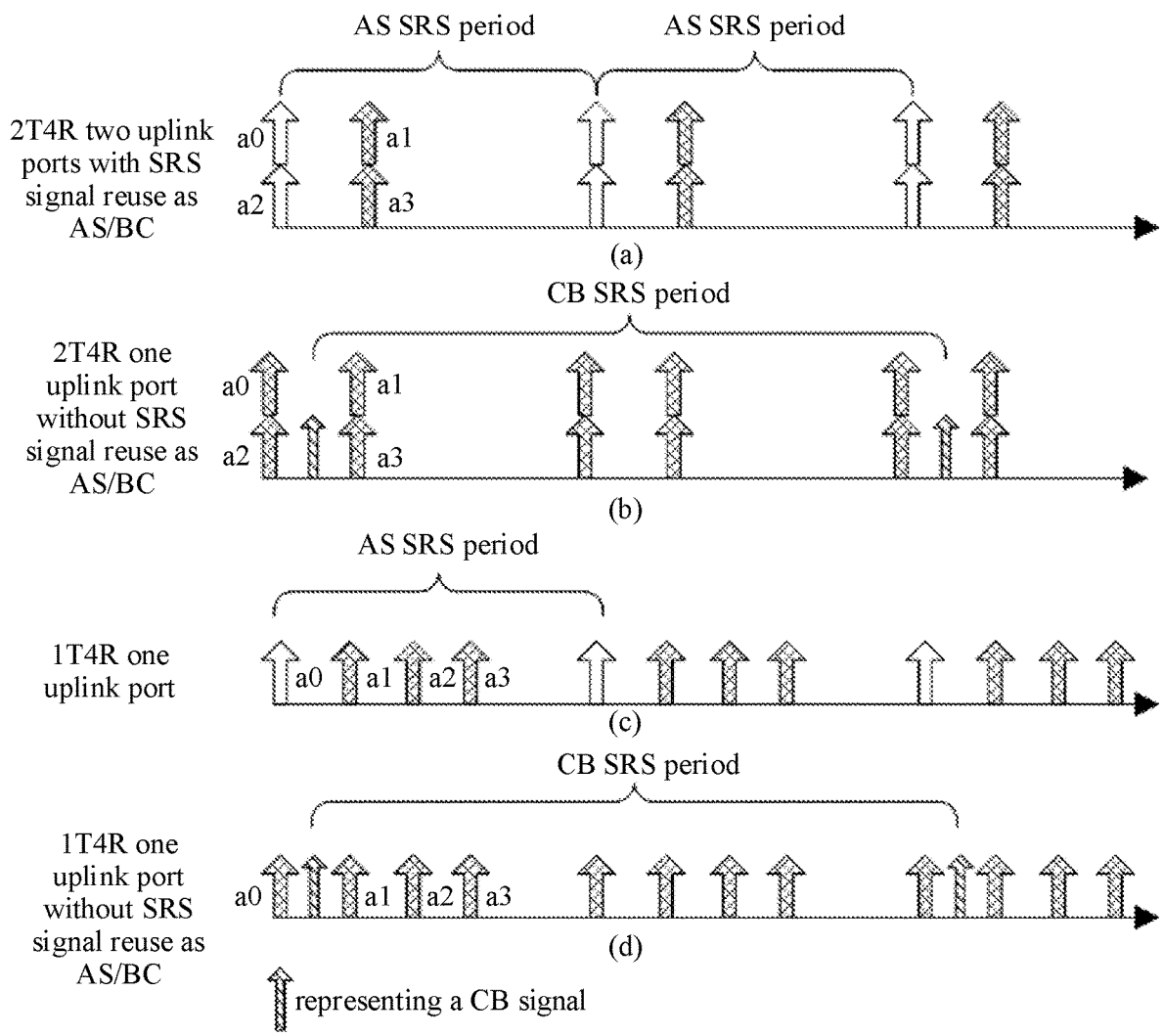
FIG. 9 is a schematic diagram of a method for controlling an output power of an antenna according to an embodiment of this application.

With reference to FIG. 9, the following specifically describes methods for controlling an output power of an antenna according to some embodiments of this application.

In FIG. 9, (a) to (d) respectively show the methods for controlling an antenna output power according to some embodiments of this application in cases in which antenna switch is 2T4R and 1T4R. In FIG. 9, different arrows are used to represent different classes of SRS signals. A blank arrow indicates that an SRS signal output power is a difference between a maximum output power and a maximum output power reduction of each antenna, and an arrow filled with a grid indicates that an SRS signal output power is the maximum output power of each antenna.

In FIG. 9, (a) shows a case in which SRS signals of which an SRS resource switches between an AS SRS resource and a CB SRS resource for reuse are transmitted through two antenna ports for uplink when antenna switch is 2T4R. As shown in (a) in FIG. 9, antennas a0 and a2 and antennas a1 and a3 separately perform transmission at different moments during an SRS period. In this case, an output power of the SRS signal of which an SRS resource switches between an AS SRS resource and a CB SRS resource for reuse is equal to the difference between the maximum output power and the maximum output power reduction of each antenna. Another SRS signal of which an SRS resource does not switch between an AS SRS resource and a CB SRS resource for reuse is transmitted at the maximum output power of each antenna.

In a case shown in (b) in FIG. 9, that is, when antenna switch is 2T4R, and an SRS signal is transmitted through a single antenna port for uplink, an SRS resource cannot switch between an AS SRS resource and a CB SRS resource for reuse. According to an implementation of this application, an AS SRS signal may be transmitted at the maximum output power of each antenna, and a CB SRS signal represented by an arrow filled with slashes in the figure is transmitted at an output power of the difference between the maximum output power and the maximum output power reduction.

Similarly, cases in which antenna switch is 1T4R are shown in (c) and (d) in FIG. 9. In FIG. 9, (c) shows a case in which an SRS signal of which an SRS resource switches between an AS SRS resource and a CB SRS resource for reuse is transmitted through a single antenna port for uplink. In this case, antennas a0, a1, a2, and a3 respectively perform transmission at different moments during the SRS period. An output power of the SRS signal of which an SRS resource switches between an AS SRS resource and a CB SRS resource for reuse is equal to the difference between the maximum output power and the maximum output power reduction of each antenna. Another SRS signal of which an SRS resource does not switch between an AS SRS resource and a CB SRS resource for reuse is still transmitted at the maximum output power of each antenna.

In a case shown in (d) in FIG. 9, that is, when antenna switch is 1T4R, and an SRS signal is transmitted through a single antenna port for uplink, an SRS resource cannot switch between an AS SRS resource and a CB SRS resource for reuse. According to an implementation of this application, an AS SRS signal may be transmitted at the maximum output power of each antenna, and a CB SRS signal represented by an arrow filled with slashes in the figure is transmitted at an output power of the difference between the maximum output power and the maximum output power reduction.

As shown in FIG. 9, when an SRS resource cannot switch between an AS SRS resource and a CB SRS resource for reuse, an AS SRS signal output power is equal to a maximum output power of an antenna, and a CB SRS signal output power is a difference between the maximum output power and a maximum output power reduction of the antenna. In this case, because only the CB SRS signal output power is reduced, if a non-SRS signal is still transmitted at a power value of a maximum output power minus a maximum output power reduction ($P_{cmaxi}-P\_MPR_i$), an SAR value is excessive. To prevent the SAR value from being excessive, an output power of other non-SRS signals of uplink channels PRACH, PUSCH, and PUCCH need to be further reduced by one value on the basis of the difference between the maximum output power and the maximum output power reduction ($P_{cmaxi}-P\_MPR_i$), to meet an electromagnetic power density exposure requirement. As described above, the reduced value is referred to as a power decrease value $SRS_{delta}$.

Herein, assuming that the maximum output power, a P-MPR, a proportion of AS SRS signals during an SRS period of each antenna, and a quantity of times for performing antenna switch are respectively $P_{cmaxi}$, $s_i$, $r_i$, and T, the power decrease value $SRS_{delta}$ may be calculated according to the following formula (2):

$$\Sigma_{i=0}^{T-1}(P_{cmaxi}-s_i) \times r_i = SRS_{delta} \times (1-\Sigma_{i=0}^{T-1} r_i) \qquad (2),\text{ where}$$

T is set to different values based on different antenna switch scenarios. For example, in a 1T2R scenario, T=2; in a 1T4R or 2T4R antenna switch scenario, T=4.

In the foregoing formula, on a left side of the equal sign indicates an output power that is "excessive" because an AS SRS signal output power is not reduced, and on a right side of the equal sign indicates a power that needs to be reduced and that corresponds to the other non-SRS signals of the uplink channels PRACH, PUSCH, and PUCCH. The two are equal, to ensure that the SAR value is not excessive.

Figure 10:
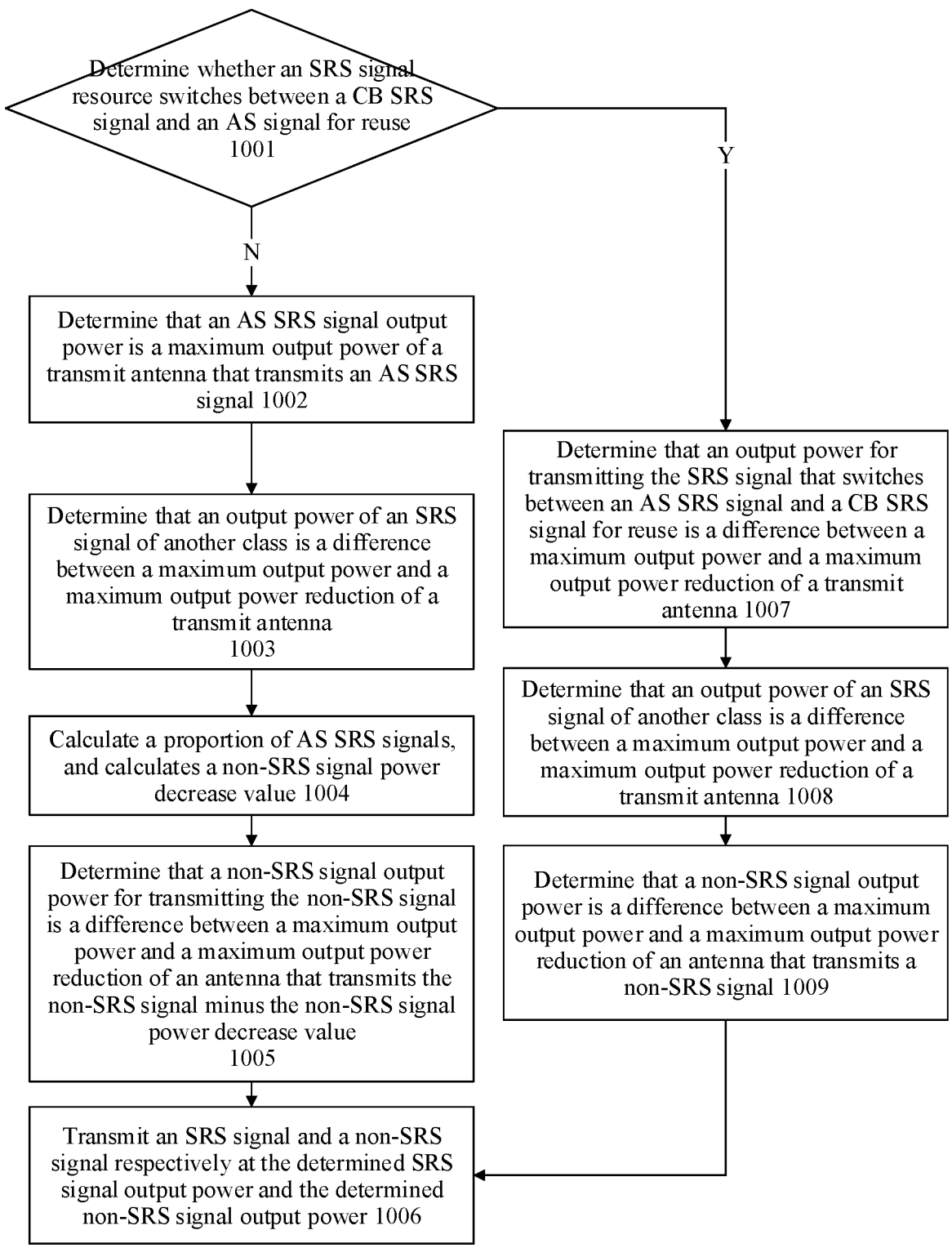
FIG. 10 is a flowchart of a method for controlling an output power of an antenna according to an embodiment of this application.

Next, refer to FIG. 10. A procedure of the methods for controlling an output power of an antenna shown in FIG. 9 according to some embodiments of this application is described.

In step 1001, UE determines whether an SRS signal switches between an AS SRS signal and a CB SRS signal for reuse. If the SRS signal does not switch between an AS SRS signal and a CB SRS signal for reuse, step 1002 is performed.

A base station schedules the UE to transmit an SRS signal by sending SRS configuration information to the UE. Therefore, in some implementations, the UE may determine, based on scheduling of the base station, for example, based on the SRS configuration information sent by the base station, whether a transmitted SRS signal switches between an AS SRS signal and a CB SRS signal for reuse.

In step 1002, the UE determines that an AS SRS signal output power is a maximum output power of a transmit antenna that transmits an AS SRS signal.

The maximum output power of each antenna is usually configured in the UE as an original initial parameter before delivery. Therefore, in some implementations, the UE may determine the maximum output power of each antenna based on, for example, factory defaults. The UE may select a transmit antenna that transmits the AS SRS signal from a plurality of antennas, and determine a maximum output power of the antenna.

In step 1003, the UE determines that an output power of an SRS signal of another class is a difference between a maximum output power and a maximum output power reduction of a transmit antenna.

As described above, in some implementations, the UE may calculate the difference between the maximum output power and the maximum output power reduction of the antenna that transmits the SRS signal of another class based on, for example, factory settings.

In step 1004, the UE calculates a proportion of AS SRS signals to a total quantity of symbols, and calculates a non-SRS signal power decrease value.

In some implementations, the UE may separately count a quantity of symbols of AS SRS signals, a quantity of symbols of all SRS signals, and a quantity of symbols of non-SRS signals that are transmitted during an SRS period, to further calculate a proportion of the quantity of symbols of the AS SRS signals to a total quantity of symbols of all signals including the SRS signals and the non-SRS signals. The non-SRS signal power decrease value is described above, and may be calculated according to the formula (2).

In step 1005, the UE determines that a non-SRS signal output power is a difference between a maximum output power and a maximum output power reduction of a transmit antenna minus the non-SRS signal power decrease value.

In some implementations, the UE selects an antenna that transmits a non-SRS signal from a plurality of antennas, and calculates a non-SRS signal output power based on a maximum output power and a maximum output power reduction of the antenna that transmits the non-SRS signal, and the power decrease value calculated in the foregoing step.

If it is determined in step 1001 that the SRS signal switches between an AS SRS signal and a CB SRS signal for reuse, step 1007 is performed.

In step 1007, the UE determines that an output power for transmitting the SRS signal that switches between an AS SRS signal and a CB SRS signal for reuse is a difference between a maximum output power and a maximum output power reduction of a transmit antenna.

In some implementations, the UE may calculate a difference between a maximum output power and a maximum output power reduction of each antenna based on, for example, factory settings. The UE may select a transmit antenna from a plurality of antennas that transmit the SRS signal that switches between an AS SRS signal and a CB SRS signal for reuse, and calculate the difference between the maximum output power and the maximum output power reduction of the antenna.

In step 1008, the UE determines that an output power of an SRS signal of another class is also a difference between a maximum output power and a maximum output power reduction of a transmit antenna.

In step 1009, the UE determines that a non-SRS signal output power is also a difference between a maximum output power and a maximum output power reduction of a transmit antenna.

In some implementations, the UE selects transmit antennas that transmit an SRS signal of another class and a non-SRS signal from a plurality of antennas. The UE may also determine, based on, for example, factory settings, a maximum output power and a maximum output power reduction of each antenna, and calculate a difference between the maximum output power and the maximum output power reduction of the corresponding antenna.

Finally, in step 1006, the UE transmits the SRS signal and the non-SRS signal respectively at the SRS signal output power and the non-SRS signal output power determined in the foregoing steps.

The UE configures the SRS signal output power and the non-SRS signal output power that are calculated based on the foregoing steps for corresponding antenna ports, and then each antenna transmits the SRS signal or the non-SRS signal at the corresponding SRS signal output power and non-SRS signal output power.

For the foregoing steps in which the UE determines the SRS signal output power and the non-SRS signal output power, refer to descriptions of related steps in FIG. 6 to FIG. 8. Details are not described herein again.

For different cases of whether an SRS signal switches between an AS SRS signal and a CB SRS signal for reuse, the technical solution of antenna power adjustment in this application is described in detail by using some specific embodiments described above. Based on different technical solutions for adjusting antenna power in FIG. 3 to FIG. 10, a plurality of combinations may be derived with reference to different cases of whether an SRS signal switches between an AS SRS signal and a CB SRS signal for reuse. However, a person skilled in the art may understand that, when no conflict occurs, embodiments in different combinations constitute the technical solution for controlling an output power of an antenna in this application.

Further, SRS signals are configured in three cases: periodic (periodic), semi-persistent (semi-persistent), and aperiodic (aperiodic). In other words, the SRS signals may be transmitted periodically, semi-persistently, or aperiodically. However, a person skilled in the art can understand that, semi-persistently transmitted SRS signals are transmitted at a fixed interval. Therefore, the semi-persistent SRS also occurs regularly like a periodic SRS. The semi-persistent SRS may be processed as a periodic SRS, or processed as a periodic SRS during a semi-persistent SRS transmission period, and a power decrease value may also be calculated according to the foregoing formula.

However, on an aperiodic SRS resource, SRS signals are transmitted irregularly. Therefore, when SRS signals are transmitted regularly and a case in which SRS signals are transmitted irregularly, a different method for controlling an output power of an antenna is provided according to still another embodiment of this application. As described above, when an SRS signal is a periodic or semi-persistent SRS signal, the power control method based on the foregoing embodiments according to this application may be implemented. However, according to still another embodiment of this application, when SRS is aperiodic, some settings may be made in advance based on the foregoing result calculated when SRS signals are transmitted regularly.

In some implementations, a proportion of SRS signals that occur regularly and a calculated corresponding power decrease value may be preset as an SRS signal proportion threshold and a corresponding power decrease value threshold, for example, an SRS signal proportion and the corresponding power decrease value that are calculated in Table 1.

Table 1 is used as an example. In a scenario in which antenna switch is 2T4R and a P-MPR is 3 dB, an SRS signal proportion 0.18% may be preset as a proportion threshold, and a corresponding power decrease value 0.0077761 dB is set as a non-SRS signal power reduction threshold. Next, a proportion of a quantity of SRS signals to a total quantity of symbols during an SRS signal transmission period is counted. The total quantity of symbols herein includes those of the SRS signals and non-SRS signals. If the proportion is not greater than the preset 0.18%, it indicates that the preset non-SRS signal power reduction threshold 0.0077761 dB is sufficient to meet an SAR value requirement. In this case, the corresponding reduction value threshold 0.0077761 dB is used.

If the proportion is greater than the preset 0.18%, it indicates that the preset non-SRS signal power reduction threshold 0.0077761 dB is insufficient to meet an SAR value requirement, and the non-SRS signal power decrease value needs to be further increased. Further, the currently counted SRS signal proportion may be compared with a higher proportion threshold until it is determined that the currently counted SRS signal proportion is less than a specific preset proportion threshold, and a preset power decrease value corresponding to the preset proportion threshold is used as a current non-SRS signal power decrease value.

For example, the SRS signal proportion may be further compared with 0.36%. If the SRS signal proportion is less than 0.36%, 0.0155941 dB is used as a current non-SRS signal power decrease value. If the SRS signal proportion is greater than 0.36%, the SRS signal proportion continues to be compared with a larger proportion threshold, until it is determined that the currently counted SRS signal proportion is less than a specific preset proportion threshold.

Finally, the UE adjusts a non-SRS signal output power based on the obtained non-SRS signal power decrease value. A non-SRS signal output power obtained through adjustment is a difference between a maximum output power and a maximum output power reduction of a transmit antenna minus the non-SRS signal power decrease value, that is, $P_{cmaxi} - P\_MPR_i - SRS_{delta}$.

Although the data in Table 1 is used as an example to describe in detail the method for calculating an additional non-SRS signal reduction value when SRS signals occur aperiodically, a person skilled in the art can understand that Table 1 is made for the purpose of explaining and describing formula (1), and the data in Table 1 is determined and calculated under some assumed conditions. Therefore, the foregoing proportion threshold and reduction value threshold need to be set according to an actual application scenario.

Figure 11:
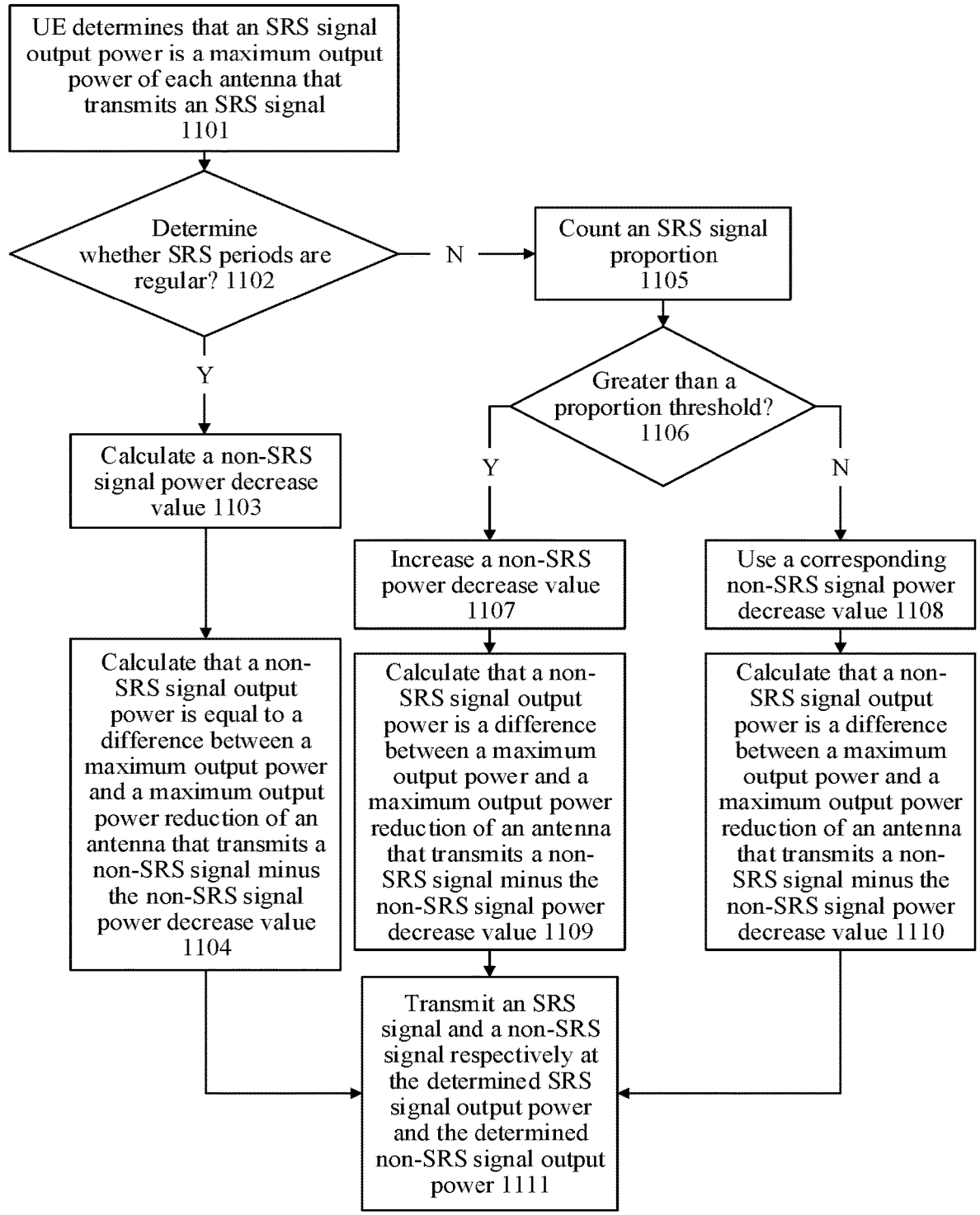
FIG. 11 is a flowchart of a method for controlling an output power of an antenna according to an embodiment of this application.

FIG. 11 is a flowchart of a method for controlling an output power of an antenna according to still another embodiment of this application when whether SRS signals are regular is determined.

As shown in FIG. 11, in step 1101, UE determines that an SRS signal output power is a maximum output power of each antenna that transmits an SRS signal.

The maximum output power of each antenna is usually configured in the UE as an original initial parameter before delivery. Therefore, in some implementations, the UE may determine the maximum output power of each antenna based on, for example, factory defaults.

In some implementations, the base station may notify, by sending SRS configuration information to the UE, the UE whether the UE is supported in transmitting the SRS signal at the maximum output power of each antenna that transmits the SRS signal. Therefore, the UE may determine, based on scheduling of the base station, for example, based on the SRS configuration information sent by the base station, that the SRS output power for transmitting the SRS signal is the maximum output power of each antenna that transmits the SRS signal.

Then, in step 1102, the UE determines whether SRS periods are regular. As described above, when SRS signals are periodically or semi-persistently transmitted, it is determined that the SRS periods are regular. Alternatively, when SRS signals are aperiodically transmitted, it is determined that the SRS periods are irregular. In some implementations, the UE may determine, based on scheduling of the base station, for example, based on the SRS configuration information sent by the base station, whether the SRS signals are transmitted regularly.

If it is determined that the SRS signals are regular, step 1103 is performed to calculate a non-SRS signal power decrease value. The non-SRS signal power decrease value is calculated based on a maximum output power of an antenna, a P-MPR of the antenna, a quantity of times for performing antenna switch, and a proportion of SRS signals during an SRS period of the antenna. The maximum output power, and the P-MPR of the antenna, and the quantity of times for performing antenna switch are usually used as original initial parameters and have been configured in the UE before delivery, and only the proportion of SRS signals during the SRS period needs to be obtained.

In some implementations, the UE may count a quantity of symbols of SRS signals transmitted and a quantity of symbols of non-SRS signals transmitted during an SRS period, and further calculate a proportion of the quantity of symbols of the SRS signals to a total quantity of symbols of all signals including the SRS signals and the non-SRS signals. Specific calculation is shown in the foregoing formula (1), and details are not described herein again.

In step 1104, the UE calculates that a non-SRS signal output power is a difference between a maximum output power and a maximum output power reduction of a transmit antenna minus the non-SRS signal power decrease value.

In some implementations, the UE selects an antenna that transmits a non-SRS signal from a plurality of antennas, and calculates a non-SRS signal output power based on a maximum output power and a maximum output power reduction of the antenna that transmits the non-SRS signal, and the power decrease value calculated in the foregoing step.

If it is determined that the SRS signals are irregular, step 1105 is performed, that is, a proportion of the SRS signals to a total quantity of symbols during the SRS period is counted.

In some implementations, the UE may count a quantity of symbols of SRS signals transmitted and a quantity of symbols of non-SRS signals transmitted during an SRS period, and further calculate a proportion of the quantity of symbols of the SRS signals to a total quantity of symbols of all signals including the SRS signals and the non-SRS signals.

In step 1106, the proportion of the SRS signals to the total quantity of symbols is compared with a proportion threshold. The proportion threshold herein is obtained through calculation according to a case in which the SRS signals are regular.

In some implementations, the proportion threshold and a corresponding power decrease value that are obtained through calculation based on a case in which the SRS signals are transmitted regularly may be pre-stored in the UE in a form of a table.

If it is determined that the proportion is greater than the proportion threshold, step 1107 is performed, and a non-SRS signal power decrease value needs to be increased.

In some implementations, a proportion threshold and a corresponding power decrease value that are obtained through calculation based on a case in which SRS signals are transmitted regularly may be pre-stored in UE as a table, for example, in a form of Table 1.

If a result of the determining is that the proportion is greater than the proportion threshold, the UE may select a larger proportion threshold from the stored table for further comparison, until the proportion of the SRS signals to the total quantity of symbols is less than or equal to a specific proportion threshold in the table.

If it is determined that the proportion is not greater than the proportion threshold, step 1108 is performed, and a non-SRS signal power decrease value corresponding to the current proportion threshold is used. As described above, the proportion threshold and the corresponding power decrease value may be pre-stored in the UE in a form of a table, and the UE may determine a power decrease value that needs to be used through table lookup.

In steps 1109 and 1110, the UE calculates non-SRS signal output powers based on non-SRS signal power decrease values obtained in steps 1107 and 1108. To be specific, the non-SRS signal output power is a difference between a maximum output power and a maximum output power reduction of a transmit antenna minus the non-SRS signal power decrease value.

The foregoing has described in detail cases in which the SRS signals are irregular, and details are not described again for steps 1105 to 1110.

Finally, in step 1111, the UE transmits an SRS signal and a non-SRS signal respectively at the SRS signal output power and the non-SRS signal output power determined in the foregoing steps. The UE configures the SRS signal output power and the non-SRS signal output power that are calculated based on the foregoing steps for corresponding antenna ports, and then each antenna transmits the SRS signal or the non-SRS signal at the corresponding SRS signal output power and non-SRS signal output power.

Next, a procedure of interaction between UE and a base station in a method according to embodiments of this application is described with reference to FIG. 12.

Figure 12:
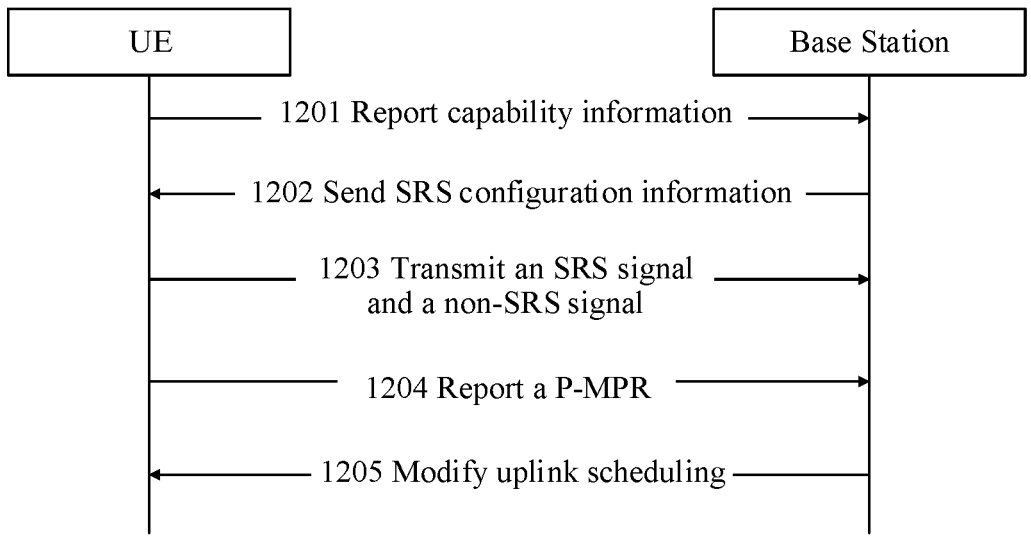
FIG. 12 is a schematic flowchart of interaction between UE and a base station according to an embodiment of this application.

As shown in FIG. 12, in step 1201, the UE first needs to determine SRS capability information, and report the capability information to the base station. The capability information herein means whether, for different SRS signal classes, the UE transmits an SRS signal to the base station without reducing a maximum output power ($P_{cmax}$) of each of at least one antenna and meeting an electromagnetic power density exposure requirement of the at least one antenna.

In some implementations, the SRS signal class in the capability information may be a class that an SRS signal does not switch between an AS SRS signal and a CB SRS signal for reuse, a class that an SRS signal switches between an AS SRS signal and a CB SRS signal for reuse, or a combination of the two.

In some implementations, the UE may use two-byte uplink information to indicate the capability information of the UE and report the capability information to the base station. For example, [0, 1] is used to indicate that the UE transmits the SRS signal at the maximum output power of the antenna when an AS SRS resource is reused as a CB SRS resource, and [1, 1] may be used to indicate that the UE transmits the SRS signal at the maximum output power of the antenna when an AS SRS resource is reused as a CB SRS resource or an AS SRS resource is not reused as a CB SRS resource.

In some implementations, if the UE does not transmit the SRS signal at the maximum output power of the antenna regardless of whether an AS SRS resource is reused as a CB SRS resource, the UE may not report the capability information to the base station. It may be understood that this is equivalent to a case in which information [0, 0] is reported.

In some implementations, the capability information further indicates at least one of the following information that is related to the capability: capability item range (Per), whether mandatory (M), whether there is a difference between TDD and FDD (FDD-TDD DIFF), and whether there is a difference between FR1 and FR2 (frequency bands) (FR1-FR2 DIFF).

In some implementations, the capability information may be preset in the UE as, for example, factory settings.

In step 1202, the base station sends SRS configuration information to the UE based on the capability information reported by the UE, that is, whether the base station supports the UE in transmitting the SRS signal without reducing the maximum output power.

In some implementations, the base station schedules the UE by performing RRC (Radio Resource Control, Radio Resource Control) or reconfiguration.

In some implementations, the base station may also schedule the UE by using two-byte downlink information. For example, [1, 0] is used to indicate that the base station may support the UE in transmitting an SRS signal at a maximum output power of an antenna when an SRS signal does not switch between an AS SRS signal and a CB SRS signal for reuse, and [0, 0] is used to indicate that the base station does not support the UE in transmitting an SRS signal at the maximum output power of the antenna when an SRS signal does not switch between an AS SRS signal and a CB SRS signal for reuse, or an SRS signal switches between an AS SRS signal and a CB SRS signal for reuse.

In some implementations, the base station may not feed back the information reported by the UE. It may be understood that this is equivalent to a case in which the information [0, 0] is fed back.

In step 1203, the UE transmits an SRS signal and a non-SRS signal to the base station based on scheduling of the base station.

A person skilled in the art can understand that whether the UE finally transmits the SRS signal at the maximum output power of the antenna is based on scheduling of the base station.

Herein, the method for determining the SRS signal output power and the non-SRS signal output power includes a method for calculating a power decrease value. This is described in detail above with reference to FIG. 3 to FIG. 11, and is not described herein again.

In addition, as described in the foregoing content, in the case in which an SRS resource switches between an AS SRS resource and a CB SRS resource for reuse, if an SRS signal is transmitted at the maximum output power of the antenna, MCS (Modulation and Coding Scheme, modulation and coding scheme) for a CB SRS signal is relatively high. In this case, the base station may schedule the UE to perform compensation to achieve uplink adaptive scheduling.

Therefore, in some implementations, the method according to this application further includes a step of scheduling, by the base station, the UE to perform compensation.

As shown in FIG. 12, in step 1204, the UE dynamically reports a P-MPR to the base station. As shown in Table 3, when an SRS resource switches between an AS SRS resource and a CB SRS resource for reuse, transmitting the SRS signal at a maximum output power of an antenna adversely affects the CB SRS signal. Therefore, in step 1204, the UE needs to report a maximum output power reduction P-MPR of an antenna that transmits the CB SRS signal to the base station.

In step 1205, the base station corrects uplink scheduling of the UE based on the P-MPR reported by the UE, that is, corrects an SRS signal output power of the antenna that transmits the CB SRS signal by using the maximum output power reduction of the antenna.

For example, if an antenna that transmits a CB SRS signal is reported to a base station that a maximum output power of the antenna is 3 dB, the base station schedules UE, so that an output power of the UE for transmitting the CB SRS signal is reduced by 3 dB.

Figure 13:
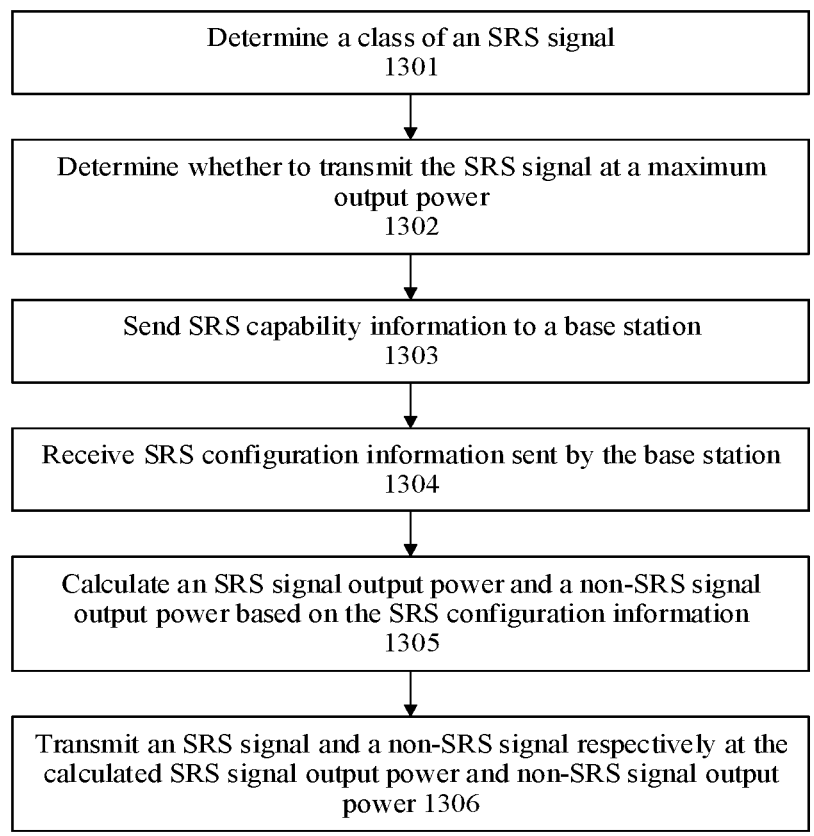
FIG. 13 is a flowchart of a method for controlling an output power of an antenna for UE according to an embodiment of this application.

FIG. 13 is a flowchart of a method for controlling an output power of an antenna for UE according to an embodiment of this application.

In step 1301, the UE determines a class of an SRS signal. The class of the SRS signal may be a class that an SRS signal does not switch between an AS SRS resource and a CB SRS resource for reuse, a class that an SRS resource switches between an AS SRS resource and a CB SRS resource for reuse, or a combination of the two.

A base station schedules the UE to transmit an SRS signal by sending SRS configuration information to the UE. Therefore, in some implementations, the UE may determine, based on scheduling of the base station, for example, based on the SRS configuration information sent by the base station, a class of the transmitted SRS signal.

In step 1302, the UE determines, based on the class of the SRS signal, whether to transmit the SRS signal at a maximum output power.

In some implementations, a result of the determining whether to transmit the SRS signal at a maximum output power by the UE may be: Regardless of whether an SRS signal switches between an AS SRS signal and a CB SRS signal for reuse, the UE transmits the SRS signal at the maximum output power. Alternatively, when an SRS signal switches between an AS SRS signal and a CB SRS signal for reuse, the UE transmits the SRS signal at a transmit power of a difference between a maximum output power and a maximum output power reduction of a transmit antenna. Alternatively, when an SRS signal does not switch between an AS SRS signal and a CB SRS signal for reuse, an AS SRS signal is transmitted at a maximum output power of a transmit antenna, and a CB SRS signal is transmitted at a transmit power of a difference between the maximum output power and a maximum output power reduction of the transmit antenna.

In step 1303, the UE sends SRS capability information to the base station. Specifically, refer to the description of step 1201 in FIG. 12. Details are not described herein again.

In step 1304, the UE receives the SRS configuration information sent by the base station. In addition, in step 1305, an SRS signal output power and a non-SRS signal output power are calculated based on the SRS configuration information. For different combinations of SRS signal classes, the UE separately performs the methods for controlling an output power of an antenna shown in FIG. 3 to FIG. 11, and details are not described herein again.

Finally, in step 1306, the UE transmits an SRS signal and a non-SRS signal respectively at the SRS signal output power and the non-SRS signal output power determined in step 1305. The UE configures the SRS signal output power and the non-SRS signal output power that are calculated based on the foregoing steps for corresponding antenna ports, and then each antenna transmits the SRS signal or the non-SRS signal at the corresponding SRS signal output power and non-SRS signal output power.

The method for determining the SRS signal output power and the non-SRS signal output power is described in detail above with reference to FIG. 3 to FIG. 11, and is not described herein.

Figure 14:
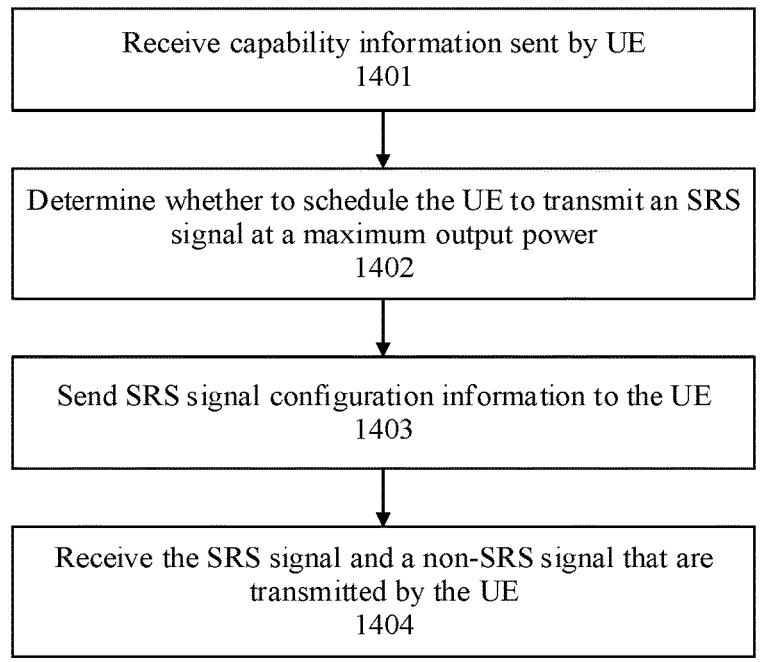
FIG. 14 is a schematic diagram of a method for controlling an output power of an antenna for a base station according to an embodiment of this application.

FIG. 14 is a schematic diagram of a method for controlling an output power of an antenna for a base station according to an embodiment of this application.

As shown in FIG. 14, in step 1401, a base station receives capability information sent by UE. As mentioned above, the capability information herein means whether, for different SRS signal classes, the UE transmits an SRS signal to the base station without reducing a maximum output power of each of at least one antenna and meeting an electromagnetic power density exposure requirement of the at least one antenna.

In step 1402, the base station determines whether to schedule the UE to transmit the SRS signal at the maximum output power. In addition, in step 1403, SRS signal configuration information is sent to the UE. Specifically, refer to the description of step 1202 in FIG. 12. Details are not described herein again.

Finally, in step 1404, the base station receives the SRS signal and a non-SRS signal that are transmitted by the UE.

It may be understood that, to implement the foregoing functions, the UE and the base station include corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different method to implement the described functions for each particular application, but it should not be considered that the implementation goes beyond the scope of this application.

In embodiments of this application, the UE and the base station may be divided into function modules based on the method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example and is merely logical function division, and there may be another division during actual implementation.

In embodiments of this application, reference may be made to each other for the foregoing embodiments. Same or similar steps and nouns are not described one by one again.

Figure 15:
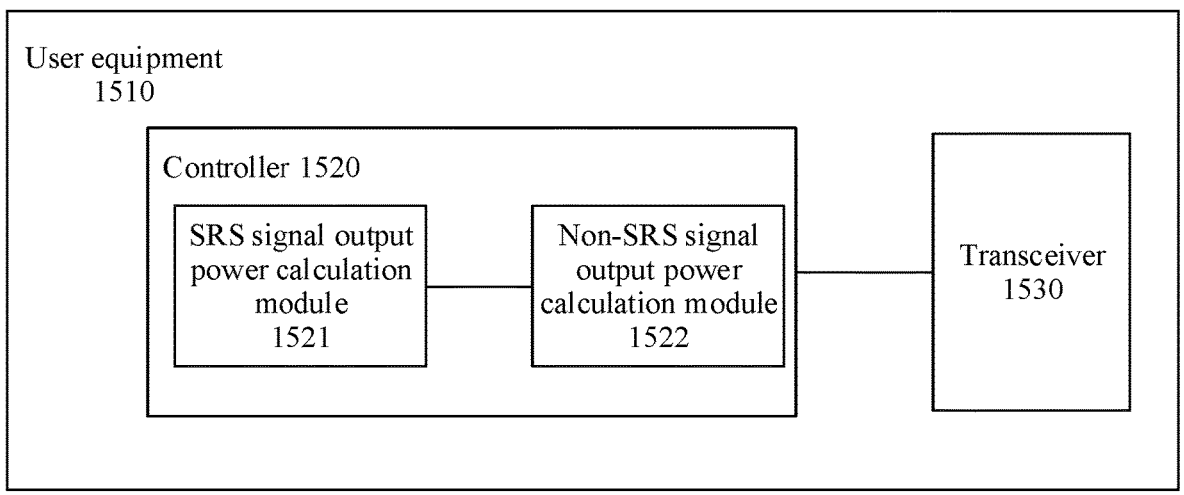
FIG. 15 is a schematic diagram of modules of user equipment according to an embodiment of this application.

FIG. 15 is a schematic diagram of modules of user equipment according to an embodiment of this application. As shown in FIG. 15, the user equipment 1510 includes a controller 1520 and a transceiver 1530.

The controller 1520 may include but is not limited to a control circuit of a modem, a central processing unit (Central Processing Unit, CPU), an application processor (Application Processor, AP), a microprocessor (Micro-programmed Control Unit, MCU), an artificial intelligence (Artificial Intelligence, AI) processor, a programmable logic device (Field Programmable Gate Array, FPGA), or the like. Different processing units may be independent components, or may be integrated into one or more processors. In a possible implementation, the controller may run an operating system, for example, Android, iOS, Windows OS, Linux, or HarmonyOS. In some other possible implementations, the controller may run a specific application program. A memory may be further disposed in the controller, and is configured to store instructions and data.

The controller 1520 further includes an SRS signal output power calculation module 1521 and a non-SRS signal output power calculation module 1522. The SRS signal output power calculation module 1521 and the non-SRS signal output power calculation module 1522 are respectively configured to calculate an SRS signal output power and a non-SRS signal output power, to perform the methods shown in the foregoing embodiments of this application.

The transceiver 1530 is configured to transmit a signal to or receive a signal from a base station through an antenna. The transceiver may include, but is not limited to, a front-end module (Front-end Module, FEM) circuit and a radio frequency (Radio Frequency, RF) circuit. The FEM circuit may include an antenna and an antenna port. For an uplink, the FEM circuit further includes a power amplifier (Power Amplifier, PA). For a downlink, the FEM circuit further includes a low noise amplifier (Low Noise Amplifier, LNA). The RF circuit may include a frequency mixer circuit, an amplifier circuit, a filter circuit, and a synthesizer circuit. The RF circuit is configured to: down-convert a received RF signal into a baseband signal, and up-convert a baseband signal into an RF signal.

Figure 16:
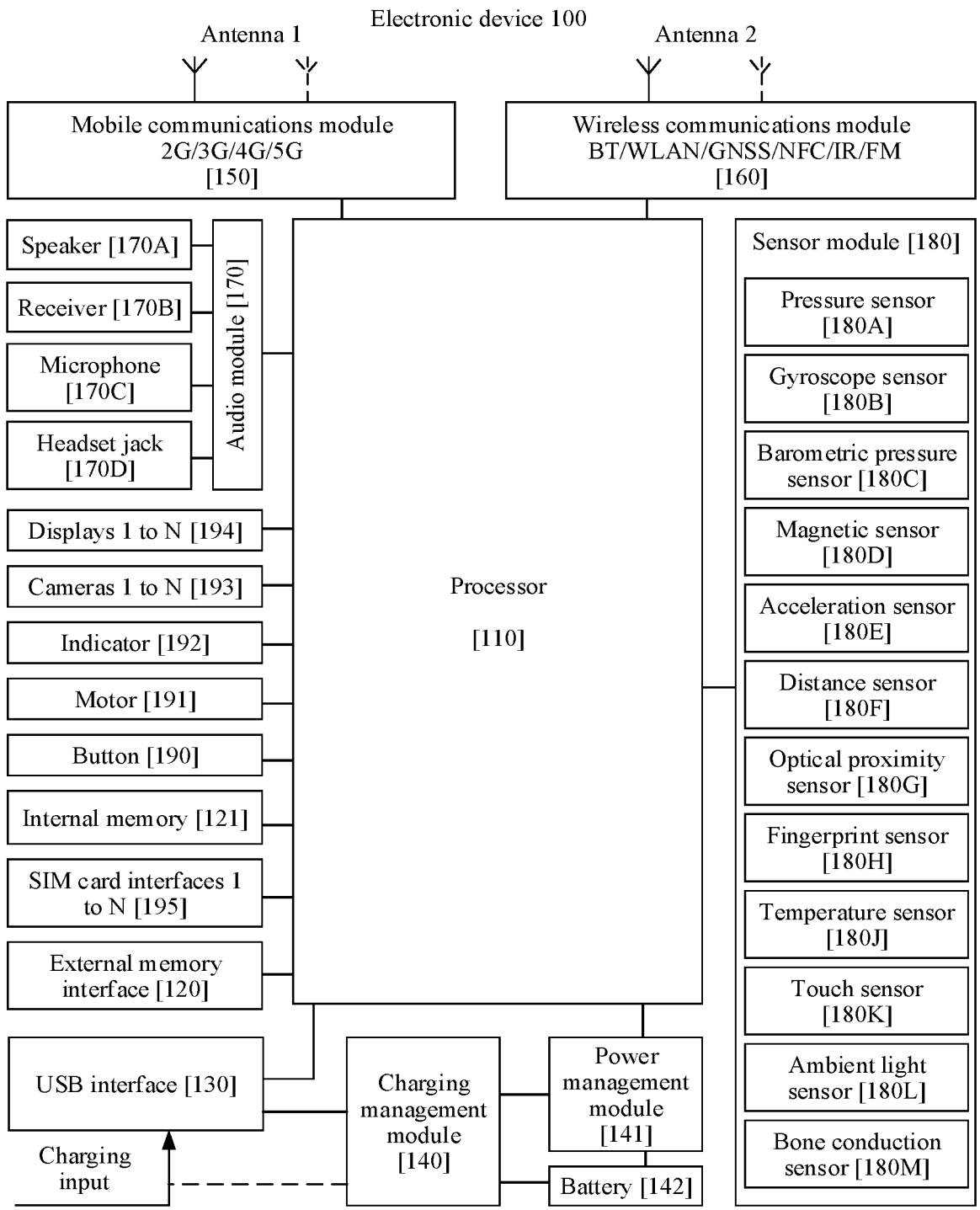
FIG. 16 is a schematic diagram of a structure of an electronic device according to an embodiment of this application.

FIG. 16 is a schematic diagram of a structure of an electronic device 100 according to an embodiment of this application.

The electronic device 100 may include a processor 110, an external memory interface 120, an internal memory 121, a universal serial bus (universal serial bus, USB) connector 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than the components shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The processor may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access and reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and a subscriber identity module (subscriber identity module, SIM) interface.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least two filters, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in the same component as the mobile communications module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The external memory interface 120 may be configured to connect to an external memory card, for example, a micro SD card, to extend a storage capability of the electronic device 100. The external memory card communicates with the processor 110 through the external memory interface 120, to implement a data storage function. For example, data such as music, and a video is stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the electronic device 100. In this embodiment of this application, the processor 1002 may be configured to perform the method for controlling an output power of an antenna shown in FIG. 3 to FIG. 14.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode. In this embodiment of this application, the user equipment may be configured to: when the optical proximity sensor 180G detects that the user holds the user equipment and approaches the head, perform the method for controlling an output power of an antenna shown in FIG. 3 to FIG. 14.

The SIM card interface 195 is configured to connect to a SIM card. The SIM card may be inserted into the SIM card interface 195 or removed from the SIM card interface 195, to come into contact with or be separated from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into one SIM card interface 195. The plurality of cards may be of a same class or different classes. The SIM card interface 195 may alternatively be compatible with different classes of SIM cards. The SIM card interface 195 may alternatively be compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

Figure 17:
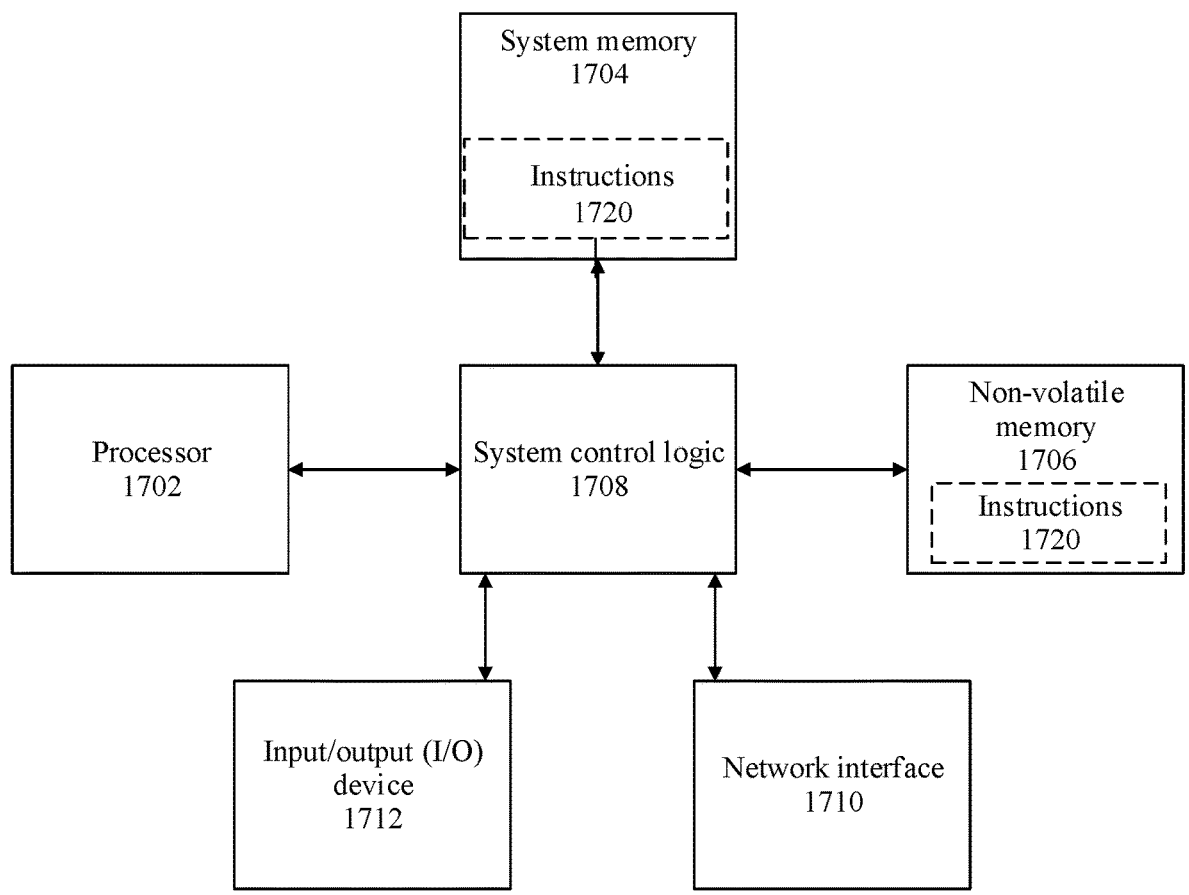
FIG. 17 is a block diagram of a communications device according to an embodiment of this application.

FIG. 17 shows a block diagram of a communications device 1700 according to an embodiment of this application. The communications device 1700 may include one or more processors 1702, system control logic 1708 connected to at least one of the processors 1702, a system memory 1704 connected to the system control logic 1708, a nonvolatile memory (NVM) 1706 connected to the system control logic 1708, and a network interface 1710 connected to the system control logic 1708.

The processor 1702 may include one or more single-core or multi-core processors. The processor 1702 may include any combination of a general-purpose processor and a dedicated processor (for example, a graphics processing unit, an application processor, or a baseband processor). In this embodiment of this specification, the processor 1702 may be configured to perform one or more of embodiments shown in FIG. 3 to FIG. 6.

In some embodiments, the system control logic 1708 may include any proper interface controller, to provide any proper interface for the at least one of the processors 1702 and/or any proper device or component that communicates with the system control logic 1708.

In some embodiments, the system control logic 1708 may include one or more memory controllers, to provide an interface connected to the system memory 1704. The system memory 1704 may be configured to: load and store data and/or instructions. In some embodiments, the memory 1704 in the device 1700 may include any proper volatile memory, for example, a proper dynamic random access memory (DRAM).

The NVM/memory 1706 may include one or more tangible non-transitory computer-readable media that are configured to store data and/or instructions. In some embodiments, the NVM/memory 1706 may include any proper nonvolatile memory such as a flash memory and/or any proper nonvolatile storage device such as at least one of an HDD (Hard Disk Drive, hard disk drive), a CD (Compact Disc, compact disc) drive, and a DVD (Digital Versatile Disc, digital versatile disc) drive.

The NVM/memory 1706 may include some storage resources on an apparatus installed on the device 1700, or may be accessed by a device, but is not necessarily a part of the device. For example, the NVM/memory 1706 may be accessed over a network through the network interface 1710.

In particular, the system memory 1704 and the NVM/memory 1706 each may include a temporary copy and a permanent copy of instructions 1720. The instructions 1720 may include instructions that enable, when executed by at least one of the processors 1702, the device 1700 to implement the method shown in FIG. 3 to FIG. 14. In some embodiments, the instructions 1720, hardware, firmware, and/or software components thereof may additionally/alternatively be deployed in the system control logic 1708, the network interface 1710, and/or the processor 1702.

In an embodiment, at least one of the processors 1702 may be packaged together with logic of one or more controllers used for the system control logic 1708 to form a system in package (SiP). In an embodiment, at least one of the processors 1702 may be integrated on a same tube core with logic of one or more controllers used for the system control logic 1708, to form a system on a chip (SoC).

The method implementations of this application may be implemented in a manner of software, a magnetic piece, firmware, or the like.

The program code may be used to input instructions, to perform each function described in this specification and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may also be implemented by using an assembly language or a machine language when needed. Actually, the mechanism described in this specification is not limited to a scope of any particular programming language. In any case, the language may be a compiled language or an interpretive language.

One or more aspects of at least one embodiment may be implemented by using representative instructions stored on a computer-readable storage medium. The instructions represent various logic in a processor, and when the instructions are read by a machine, the machine acts on the logic for performing the technologies described in this specification. These representations referred to as "IP cores" may be stored in a tangible computer-readable storage medium, and provided for a plurality of customers or production facilities for loading into a manufacturing machine that actually manufactures the logic or the processor.

Although this application is described with reference to an example embodiment, it does not mean that a characteristic of this application is limited only to this implementation. On the contrary, a purpose of describing the present invention with reference to the implementations is to cover other selections or modifications that may be derived based on the claims of this application. To provide an in-depth understanding of this application, the following descriptions include a plurality of specific details. This application may be alternatively implemented without using these details. In addition, to avoid confusion or blurring the focus of this application, some specific details are omitted from the descriptions. It should be noted that embodiments in this application and the features in embodiments may be mutually combined in the case of no conflict.

In addition, various operations are described as a plurality of discrete operations in a manner that is most conducive to understanding illustrative embodiments. However, an order described should not be construed as implying that these operations need to depend on the order. In particular, these operations do not need to be performed in the rendered order.

As used herein, a term "module" or "unit" may mean, be, or include: an application-specific integrated circuit (ASIC), an electronic circuit, a (shared, special-purpose, or group) processor and/or a memory that executes one or more software or firmware programs, a composite logic circuit, and/or another appropriate component that provides the described functions.

In the accompanying drawings, some structure or method features may be shown in a particular arrangement and/or order. However, it should be understood that such a particular arrangement and/or order may not be required. In some embodiments, these features may be arranged in a manner and/or order different from that shown in the illustrative accompanying drawings. In addition, inclusion of the structure or method features in a particular figure does not imply that such features are required in all embodiments. In some embodiments, these features may not be included or may be combined with other features.

Embodiments of a mechanism disclosed in this application may be implemented by hardware, software, firmware, or a combination of these implementations. Embodiments of this application may be implemented as a computer program or program code executed in a programmable system. The programmable system includes a plurality of processors, a storage system (including a volatile memory, a nonvolatile memory, and/or a storage element), a plurality of input devices, and a plurality of output devices.

The program code may be used to input instructions, to perform each function described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may also be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. In some cases, one or more aspects of at least some embodiments may be implemented by expressive instructions stored in a computer-readable storage medium. The instructions represent various types of logic in a processor, and when the instructions are read by a machine, the machine manufactures logic for performing the technologies described in this application. These representations referred to as "IP cores" may be stored in a tangible computer-readable storage medium, and provided for a plurality of customers or production facilities for loading into a manufacturing machine that actually manufactures the logic or the processor.

Such a computer-readable storage medium may include but is not limited to non-transient tangible arrangements of articles manufactured or formed by machines or devices. The computer-readable storage medium includes a storage medium, for example, a hard disk or any other class of disk including a floppy disk, a compact disc, a compact disc read-only memory (CD-ROM), a compact disc rewritable (CD-RW), or a magneto-optical disc; a semiconductor device, for example, a read-only memory (ROM) such as a random access memory (RAM) including a dynamic random access memory (DRAM) or a static random access memory (SRAM), an erasable programmable read-only memory (EPROM), a flash memory, or an electrically erasable programmable read-only memory (EEPROM); a phase change memory (PCM); a magnetic card or an optical card; or any other class of appropriate medium for storing electronic instructions.

Therefore, embodiments of this application further include a non-transient computer-readable storage medium. The medium includes instructions or design data, for example, a hardware description language (HDL), and defines a structure, a circuit, an apparatus, a processor, and/or a system feature described in this application.

What is claimed is:

1. A method for controlling an output power of an antenna for user equipment, comprising:
   during a sounding reference signal (SRS) transmission period, transmitting, by a first antenna of at least one antenna of the user equipment, a first SRS to a base station at a first SRS output power, wherein the first SRS is a SRS and the first SRS output power is equal to a maximum output power ($P_{cmax}$) of the first antenna; and
   during the SRS transmission period, transmitting a non-SRS to the base station at a non-SRS output power, wherein the non-SRS output power is less than a difference between the maximum output power of the first antenna and a maximum output power reduction of the first antenna, and the maximum output power reduction of the first antenna is set to meet an electromagnetic power density exposure requirement of the first antenna.

2. The method according to claim 1, wherein:
   the electromagnetic power density exposure requirement is related to at least one of a specific absorption rate (SAR), a location of the first antenna in the user equipment, or a distance between the user equipment and a user.

3. The method according to claim 1, wherein:
   the first SRS comprises an antenna switch (AS) SRS or an SRS that switches between a code book (CB) SRS and an AS SRS for reuse.

4. The method according to claim 3, further comprising:
   transmitting, by each antenna other than the first antenna in the at least one antenna, a first SRS to the base station at a respective maximum output power.

5. The method according to claim 4, further comprising:
   calculating a non-SRS power decrease value according to the following formula:

$\Sigma_{i=0}^{T-1}(P_{cmaxi}-s_i) \times r_i = SRS_{delta} \times (1-\Sigma_{i=0}^{T-1}r_i)$, wherein:

a maximum output power, a maximum power reduction (P-MPR), a proportion of SRSs during an SRS transmission period of each antenna, and a quantity of times for performing antenna switch are respectively $P_{cmaxi}$, $s_i$, $r_i$, and T, and $SRS_{delta}$ is the non-SRS power decrease value; and
   calculating the non-SRS output power based on the non-SRS power decrease value, wherein the non-SRS output power is equal to the difference between the maximum output power of the first antenna and the maximum output power reduction of the first antenna minus the non-SRS power decrease value.

6. The method according to claim 1, further comprising:
   during the SRS transmission period, transmitting, by the first antenna, a second sounding reference signal (SRS) to the base station at a second SRS output power of the first antenna, wherein the second SRS output power is equal to the difference between the maximum output power of the first antenna and the maximum output power reduction of the first antenna.

7. The method according to claim 6, wherein the first SRS comprises an antenna switch (AS) SRS, and the second SRS comprises a code book (CB) SRS.

8. The method according to claim 7, further comprising:
   during the SRS transmission period, transmitting, by each antenna other than the first antenna in the at least one antenna:
      the first SRS to the base station at a respective maximum output power; or
      transmitting the second SRS to the base station at the second SRS output power.

9. The method according to claim 6, further comprising:
   calculating a non-SRS power decrease value according to the following formula:

$\Sigma_{i=0}^{T-1}(P_{cmaxi}-s_i) \times r_i = SRS_{delta} \times (1-\Sigma_{i=0}^{T-1}r_i)$, wherein:

a maximum output power, a maximum power reduction (P-MPR), a proportion of antenna switch (AS) SRSs during an SRS transmission period of each antenna, and a quantity of times for performing antenna switch are respectively $P_{cmaxi}$, $s_i$, $r_i$, and T, and $SRS_{delta}$ is the non-SRS power decrease value, and
   calculating the non-SRS output power based on the non-SRS power decrease value, wherein the non-SRS output power is equal to the difference between the maximum output power of the first antenna and the maximum output power reduction of the first antenna minus the non-SRS power decrease value.

10. The method according to claim 9, wherein the first SRS comprises an antenna switch (AS) SRS, and the second SRS comprises an SRS that switch between an antenna switch (AS) signal and a code book (CB) SRS for reuse.

11. The method according to claim 1, further comprising:
    during the SRS transmission period, transmitting, by a second antenna of the at least one antenna, a second sounding reference signal (SRS) to the base station at a second SRS output power, wherein the second SRS output power is equal to a difference between a maximum output power of the second antenna and a maximum output power reduction of the second antenna, wherein the maximum output power reduction of the second antenna is set to meet an electromagnetic energy absorption requirement of the second antenna.

12. The method according to claim 11, further comprising, during the SRS transmission period:
- transmitting, by each antenna other than the first antenna and the second antenna of the at least one antenna, the first SRS to the base station at a respective maximum output power; or
- transmitting the second SRS to the base station at the second SRS output power.

13. The method according to claim 1, further comprising: when the SRS transmission period occurs irregularly:
- obtaining a proportion of a quantity of the SRSs to a total quantity of symbols during the SRS transmission period, wherein the total quantity of symbols comprises the SRS and the non-SRS;
- comparing the proportion with a proportion threshold; and
- when the proportion is greater than the proportion threshold, increasing a non-SRS power decrease value of the non-SRS, and calculating the non-SRS output power based on the increased non-SRS power decrease value; or
- when the proportion is less than or equal to the proportion threshold, calculating the non-SRS output power by using a non-SRS power decrease value corresponding to the proportion threshold, wherein:
- the proportion threshold and the non-SRS power decrease value are obtained when the SRS transmission period occurs regularly.

14. The method according to claim 1, wherein the non-SRS comprises other signals transmitted through uplink channels PUCCH, PUSCH, and PRACH.

15. A non-transitory computer-readable storage medium storing one or more programming instructions executable by at least one processor to cause the at least one processor to perform following operations for controlling an output power of an antenna for user equipment:
- during a sounding reference signal (SRS) transmission period, transmitting, by a first antenna of at least one antenna of the user equipment, a first SRS to a base station at a first SRS output power, wherein the first SRS is a SRS and the first SRS output power is equal to a maximum output power ($P_{cmax}$) of the first antenna; and
- during the SRS transmission period, transmitting a non-SRS to the base station at a non-SRS output power, wherein the non-SRS output power is less than a difference between the maximum output power of the first antenna and a maximum output power reduction of the first antenna, and the maximum output power reduction of the first antenna is set to meet an electromagnetic power density exposure requirement of the first antenna.

16. The non-transitory computer-readable storage medium according to claim 15, wherein the electromagnetic power density exposure requirement is related to at least one of a specific absorption rate (SAR), a location of the first antenna in the user equipment, or a distance between the user equipment and a user.

17. The non-transitory computer-readable storage medium according to claim 15, wherein the first SRS comprises an antenna switch (AS) SRS or an SRS that switches between a code book (CB) SRS and an AS SRS for reuse.

18. A user equipment, comprising:
- one or more processors; and
- a non-transitory computer readable medium storing one or more instructions that when executed by the one or more processors, cause the user equipment to perform operations comprising:
  - during a sounding reference signal (SRS) transmission period, transmitting, by a first antenna of at least one antenna of the user equipment, a first SRS to a base station at a first SRS output power, wherein the first SRS is a SRS and the first SRS output power is equal to a maximum output power (Pema) of the first antenna; and
  - during the SRS transmission period, transmitting a non-SRS to the base station at a non-SRS output power, wherein the non-SRS output power is less than a difference between the maximum output power of the first antenna and a maximum output power reduction of the first antenna, and the maximum output power reduction of the first antenna is set to meet an electromagnetic power density exposure requirement of the first antenna.

19. The user equipment according to claim 18, wherein the electromagnetic power density exposure requirement is related to at least one of a specific absorption rate (SAR), a location of the first antenna in the user equipment, or a distance between the user equipment and a user.

20. The user equipment according to claim 18, wherein the first SRS comprises an antenna switch (AS) SRS or an SRS that switches between a code book (CB) SRS and an AS SRS for reuse.

* * * * *